(12) United States Patent
Krueger et al.

(10) Patent No.: US 12,710,350 B2
(45) Date of Patent: Aug. 18, 2026

(54) DEVICE AND METHOD TO BE CARRIED OUT FOR EXAMINING AND/OR PROCESSING AN IN PARTICULAR BIOLOGICAL OR MEDICAL SAMPLE

(71) Applicant: LPKF LASER & ELECTRONICS SE, Garbsen (DE)

(72) Inventors: Robin Alexander Krueger, Hannover (DE); Malte Schulz-Ruhtenberg, Wunstorf (DE); Moritz Woller, Neustadt am Ruebenberge (DE); Tilo Staat, Hannover (DE); Jan Van Aalst, Barsinghausen (DE)

(73) Assignee: LPKF LASER & ELECTRONICS SE, Garbsen (DE)

( * ) Notice: Subject to any disclaimer, the term of this patent is extended or adjusted under 35 U.S.C. 154(b) by 209 days.

(21) Appl. No.: 18/835,367

(22) PCT Filed: Nov. 24, 2022

(86) PCT No.: PCT/EP2022/083138
§ 371 (c)(1),
(2) Date: Aug. 2, 2024

(87) PCT Pub. No.: WO2023/147908
PCT Pub. Date: Aug. 10, 2023

(65) Prior Publication Data

US 2025/0130157 A1 Apr. 24, 2025

(30) Foreign Application Priority Data

Feb. 4, 2022 (DE) ..................... 10 2022 102 711.2

(51) Int. Cl.
*G01N 15/1434* (2024.01)
*B01L 3/00* (2006.01)
(Continued)

(52) U.S. Cl.
CPC ........ *G01N 15/1434* (2013.01); *B01L 3/5085* (2013.01); *G01N 15/1425* (2013.01);
(Continued)

(58) Field of Classification Search
CPC ........... G01N 15/1434; G01N 15/1425; G01N 15/1433; G01N 35/1002; G01N 35/028;
(Continued)

(56) References Cited

U.S. PATENT DOCUMENTS 5,540,891 A 7/1996 Portmann et al.
6,823,079 B1 11/2004 Winterot et al.
(Continued)

FOREIGN PATENT DOCUMENTS

DE 19712484 A1 10/1998
DE 10039195 A1 2/2002
(Continued)

*Primary Examiner* — Md M Rahman
(74) *Attorney, Agent, or Firm* — LEYDIG, VOIT & MAYER, LTD.

(57) ABSTRACT

A device for examining and/or treating a sample includes a dispensing unit for dispensing the sample into a sample holder comprising a plurality of wells. Each well has an opening and a base area. The device further includes an optical examining unit, a removal unit for removing the sample from the sample holder and, and a receptacle for moving the sample holder into different work positions within a work region delimited by a respective well. In a respective work position, the optical examining unit, the dispensing unit, and the removal unit are positioned within the work region coaxially on two opposite sides of the sample holder along an optical axis of the optical examining unit. The base area of each respective well is transparent such that an optical capture of the sample is implemented through the base area.

17 Claims, 21 Drawing Sheets

(51) Int. Cl.

| | |
|---|---|
| ***G01N 15/14*** | (2024.01) |
| ***G01N 15/1433*** | (2024.01) |
| ***G01N 35/10*** | (2006.01) |

(52) U.S. Cl.

CPC ..... *G01N 15/1433* (2024.01); *G01N 35/1002* (2013.01); *B01L 2200/143* (2013.01); *B01L 2300/0838* (2013.01)

(58) Field of Classification Search

CPC ........... G01N 15/0227; G01N 15/1429; G01N 2015/0294; G01N 2015/1006; G01N 2015/1445; G01N 2015/1493; G01N 2015/1497; B01L 3/5085; B01L 2200/143; B01L 2300/0838; B01L 3/021; B01L 3/0268; B01L 2200/0652; B01L 2300/0829; B01L 2300/0851; B01L 2300/0893; B01L 2400/0406; B01L 2400/0481; B01L 9/523; G02B 7/005

USPC .......................................................... 356/337

See application file for complete search history.

(56) References Cited

U.S. PATENT DOCUMENTS

| | | | |
|---|---|---|---|
| 10,032,615 | B2 | 7/2018 | Agar et al. |
| 10,101,276 | B2 | 10/2018 | Kimura et al. |
| 2005/0019513 | A1 | 1/2005 | Papra et al. |
| 2009/0078885 | A1 | 3/2009 | Kilper |
| 2010/0182419 | A1 | 7/2010 | Jiang |
| 2012/0045826 | A1 | 2/2012 | Yantz et al. |
| 2012/0094324 | A1 | 4/2012 | Durack |
| 2013/0300032 | A1 | 11/2013 | Knebel et al. |
| 2015/0198537 | A1 | 7/2015 | Kimura et al. |
| 2019/0113457 | A1 | 4/2019 | Espinoza Vallejos et al. |
| 2019/0309257 | A1 | 10/2019 | Aratani et al. |
| 2020/0339935 | A1 | 10/2020 | Izume et al. |
| 2020/0346210 | A1 | 11/2020 | Hubbuch et al. |
| 2022/0171176 | A1 | 6/2022 | Pelzer et al. |
| 2023/0109873 | A1 * | 4/2023 | Corso .................... C12N 15/87 435/285.2 |
| 2023/0303959 | A1 * | 9/2023 | Blanchard .......... G01N 15/1433 |

FOREIGN PATENT DOCUMENTS

| | | | |
|---|---|---|---|
| DE | 19916749 | B4 | 2/2004 |
| DE | 10334164 | A1 | 2/2005 |
| DE | 102005053669 | B4 | 12/2007 |
| DE | 102007046267 | A1 | 4/2009 |
| DE | 102019109207 | B3 | 6/2020 |
| DE | 102019003135 | A1 | 11/2020 |
| EP | 0648536 | A1 | 4/1995 |
| EP | 0706646 | B1 | 3/1998 |
| EP | 2411134 | A1 | 2/2012 |
| JP | 2015130805 | A | 7/2015 |
| JP | 2018108038 | A | 7/2018 |
| JP | 2019180394 | A | 10/2019 |
| WO | WO 2018094109 | A1 | 5/2018 |

* cited by examiner 9
27
28
26
25
10
2

27
28
26
25
10
2

D
D
11
H
11
13
Fig. 13a
Fig. 13b
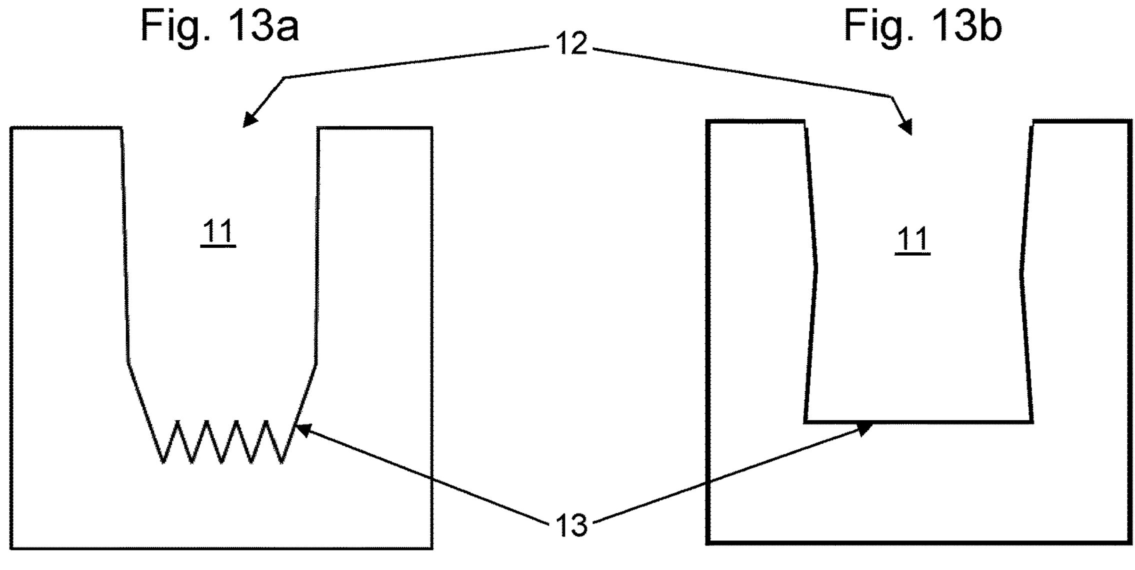
Fig. 13c
Fig. 13d
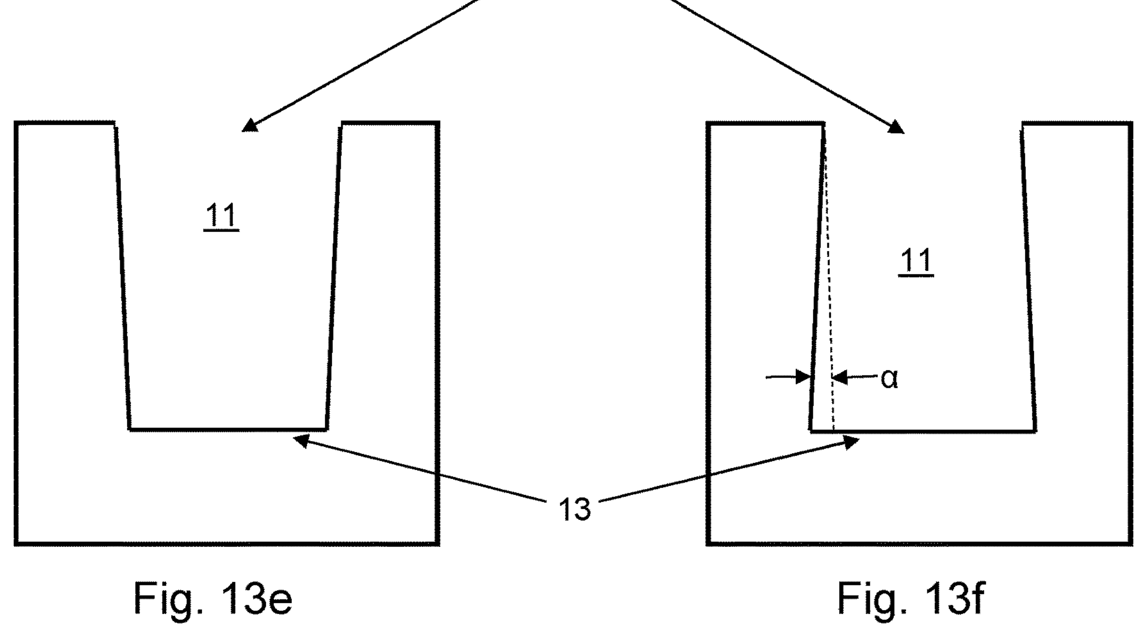
Fig. 13e
Fig. 13f 11
13
11

13
10

13
10

13
10

DEVICE AND METHOD TO BE CARRIED OUT FOR EXAMINING AND/OR PROCESSING AN IN PARTICULAR BIOLOGICAL OR MEDICAL SAMPLE

CROSS REFERENCE TO RELATED APPLICATIONS

This application is a U.S. National Phase application under 35 U.S.C. § 371 of International Application No. PCT/EP2022/083138, filed on Nov. 24, 2022, and claims benefit to German Patent Application No. DE 10 2022 102 711.2, filed on Feb. 4, 2022. The International Application was published in German on Aug. 10, 2023 as WO/2023/147908 A1 under PCT Article 21(2).

FIELD

Embodiments of the present invention relate to a device and a method designed to be conducted for examining and/or treating a sample, in particular a biological or medical sample, for example cells, including living cells, and/or particles.

BACKGROUND

The analysis of a cell culture or even of an individual cell is currently only attainable with significant outlay on account of machine and method-related limitations. Isolating individual cells from tiny samples, in particular, is found to be very difficult since individual cells have to be captured under a microscope by laboratory staff, and the captured cell needs to then be manipulated with the aid of capillaries.

Sample holders for examining biological or medical samples are used in the fields of cell biology and medicine in particular. For most experiments, it is advantageous if the sample can be positioned accurately. This allows the experiments to be carried out efficiently, provides for increased comparability between multiple experiments and facilitates the evaluation. A random arrangement of the sample frequently sets in when filling a sample holder.

Such samples, in particular cell populations, are typically heterogeneous in terms of the type of cells, the stage of cells or else in respect of the individual differences, e.g. genetic differences, and possible combinations thereof. Examinations of heterogeneous cell populations naturally only discover average characteristics. This might be the basic ability to produce a specific protein or examine the reaction to an active ingredient or medicament. For example, it is also possible to examine whether or to what extent the cells have taken up and integrated a gene following the introduction of genetic material by transfection or transduction.

The cells have to be treated and examined on an individual basis should characteristics of individual cells or a few cells and/or their interaction be uncovered. By preference, methods which are able to spatially separate the cells from other cells (compartmentalization) are suitable to this end.

All of the available methods have substantial disadvantages. Thus, for example, separating cells on growth media is found to be disadvantageous on account of the large base area required. Moreover, the ability to expose the cells to different conditions or substances is only very limited.

U.S. Pat. No. 10,101,276 B2 already describes the aspiration and collection of cells on the basis of optical information from certain cells, wherein the measuring chip consists of a light-transmissive material with a well formed therein containing a fluid with at least one cell. The cell is ejected at a predetermined position on the sample holder by a suction-ejection capillary.

Individual cell printers with a three-axis laboratory robot, a printing head with a print cartridge for the cell suspension and a microscope optical unit are also known. The functionality is similar to that of an inkjet printer.

The sample in the interior of the printing head is analyzed by means of a microscope optical unit and a fast camera. As a result, the cells situated in the sample can be detected and classified according to optical criteria such as size and morphology. Should the captured content of the drop to be printed not meet the requirements, it is aspirated, and so only drops with a single cell that meets the criteria are dispensed in the envisaged position on the sample holder, for example a microtiter plate equipped with a multiplicity of separate wells (up to 1536 wells). As a result of the optical detection by means of the camera, verification of the individual cell can be implemented directly during the printing process.

Cell treatment by way of the droplet technology described in EP 2 411 134 A1, for example, for creating emulsified droplets in which a droplet fluid phase is created in a carrier fluid phase, by contrast, requires little base area and allows the creation of relatively large amounts of "encapsulated" cells, which can also be exposed to different conditions. However, it is found to be disadvantageous that the cells within the carrier fluid phase do not allow optimal optical analysis, e.g. on account of the difficult affixability of the droplets and their optical properties. Moreover, this method is generally suited only to short-term experiments (shorter than one day) since it is difficult to supply fresh nutrients and metabolism products can hardly be removed. Furthermore, the oxygen which is frequently required cannot be supplied optimally. However, even the use of the carrier fluid phase, frequently an oil in practice, may have a direct influence on the results of experiments should the carrier fluid phase be not inert, allow medicaments to diffuse to the outside, etc.

Transferability to in vivo conditions is therefore often assessed as inadequate, usually restricting the use of this technology to experiments taking several hours or less.

US 2010/0 182 419 A1 discloses a vacuum bed-equipped holder for containers for biological samples, for example microtiter plates, said holder being moved continually in relation to a light beam that illuminates the sample in a well while a camera records an image of the sample in the well. For illuminating a sample, the light beam is configured such that it directly illuminates either the entire sample or only a part of the sample. In this case, the beam is diverted to other parts such that the entire sample can be imaged using a series of images of different parts of the sample.

An improvement during long-term experiments and in the transferability to in vivo conditions lies in the use of biologically inert materials of the sample holder. In this context, glass, silicon and some plastics such as PDMS, COP/COC, PS, PC are used in particular. In this case, a distinction is made between two different approaches.

In microfluidic approaches, the cells, usually as isolated suspension, are put into a channel system which enables the spatial separation of the cells by the spatial design of the channel system and a kind of pockets, undercuts or chambers. For physical manipulation, i.e. for moving, sorting and rejecting the cells, use can be made of flow dynamics or electric, magnetic or acoustic fields, for example. An advantage of this approach lies in the option of being able to test many cells in inert surroundings while requiring little amounts of space and reagent.

It is found to be disadvantageous that the cells can generally only be exposed to corresponding conditions; this is often disadvantageous for the examination of different active ingredients. Moreover, the construction, production and also use of such microfluidic systems requires well-founded expertise, and so such systems are found to be expedient from an economical point of view in only a few cases.

Microtiter plates are frequently used for the simple handling of samples. These comprise a multiplicity of correspondingly small depressions or cavities (up to 3456), also referred to as wells, for receiving the samples. Microtiter plate dimensions are standardized to facilitate microtiter plate handling.

The use of multiwell plates or microtiter plates as a sample holder is an established method in practice. In particular, the versatility of their use, the availability of comprehensive equipment for loading, analyzing or else isolating the samples from these plates, the production of the multiwell plates or microtiter plates at economically attractive costs so as to be suitable for the masses and the obviousness of their functionality, which requires little specialist knowledge to enable use are advantages with regards to the use thereof in cell experiments under biologically inert conditions.

A disadvantage often come across lies in the formats of the well dimensions available in practice, for example between 1.1 and 2 mm diameter, which are many times larger than the individual cells to be examined with a typical size of 10-20 μm. Bacteria, for example *E. coli*, even have typical diameters of 1-2 μm and lengths of 2-6 μm.

According to regulatory agencies, medicaments on the basis of recombinant proteins produced by cells need to be traced back to a single cell ("monoclonal property"). The evidence for only a single cell being situated in a well, in accordance with the strict requirements for such medicaments, requires protracted scanning of a large well volume in order to finally capture the cell optically and in particular exclude the presence of further cells. Especially in the case of a large number of isolated cells, e.g. 10 000 to more than 1 000 000 cells, this causes a huge number of microscope images which needs to be evaluated and also stored. This makes data storage/processing a significant cost factor and the scanning duration a substantial time factor.

Further, the required fill volume of the wells is a substantial cost factor, especially in the case of large cell populations, since expensive reagents are generally used. A disadvantage in practice is that hundreds or even thousands of microtiter plates have to be handled and incubated quickly in the case of large populations; this involves logistical efforts, causes a need for large spaces and is susceptible to errors since the microtiter plates can be mixed up.

Further, the examination of a very large number of cells leads to the necessity of using and coordinating or synchronizing different apparatuses for positioning, performing microscopy on, isolating and incubating the sample, with each apparatus being linked with high procurement costs. In practice, even the joint control of the various apparatuses is found to be problematic, and so such strategies have an appropriate company size as a prerequisite, but compatibility disadvantages arise and the probabilities of error increase nevertheless.

U.S. Pat. No. 10,032,615 B2 has disclosed an analysis device for isolated cells, having a substrate comprising a multiplicity of wells which have a depth of between 1 μm and 250 μm, an opening with a diameter of between 10 μm and 100 μm and a volume of between 1 pL and 10 nL and which receive a suspension with a cell concentration of between 1000 cells/ml and 500 000 cells/ml. The wells are configured such that at least 25% of the wells contain only a single cell, and the isolated cell can be examined optically.

The prior art also already contains microtiter plates as disclosed in for example DE 197 12 484 A1, DE 10 2019 003 135 A1 or DE 10 2019 109 207 B3.

Moreover, EP 0 706 646 B1 describes a sample holder which can receive a multiplicity of samples to be examined with a volume of less than 10 μL in particular. The bases of the wells are preferably porous such that the samples can be aspirated out of the wells via their porous bases by way of the application of negative pressure to the underside of the sample holder.

US 2019/0 113 457 A1 describes a method for processing cell-containing wells of a multiwell chip, wherein a cell suspension volume of between 30 nL and 50 nL is dispensed into the wells. A plurality of images of the wells are captured in a plurality of z-planes, and a map is created on the basis of the recorded multiplicity of images in at least three z-planes, the map identifying empty wells and cell-containing wells of the multiwell chip. The image capture can simultaneously comprise a plurality of wells by virtue of these being imaged individually in successive fashion or within a single microscope image, in such a way that a plurality of wells can be imaged simultaneously.

The problem addressed by EP 0 648 536 A1 is that when methods with a photometric evaluation of aqueous samples are conducted with the use of microtiter plates, the results are interfered with and falsified by the meniscus that has formed. The meniscus formation is the result of surface and interface tension, and so a convex or concave surface forms depending on the fluid. The use of materials with different physical properties for the vessel walls and for the vessel bases is proposed as a solution to the problem, in order to achieve the case that the sample to be analyzed has an edge angle of approximately 90° with respect to the vessel wall, and hence the radiation is not absorbed substantially and the beam path is not influenced during the analysis.

DE 199 16 749 B4 relates to a method for examining samples contained in sample vessels of a microtiter plate, the examination being conducted by imaging at least some of the sample volume through the base of the sample vessel by means of a CCD camera and an evaluation unit. Reflections from the top side or the underside of the base of the sample vessel are captured in the process, and a control algorithm is used to determine a correction value for focusing on the sample in the interior of the sample vessel.

U.S. Pat. No. 10,101,276 B2 describes a device for aspirating a cell, wherein optical information captured by a sensor is used as a basis for seeking for predetermined cells which are contained in a measuring chip made of a light-transmitting material with a well formed therein.

Moreover, DE 10 2005 053 669 B4 describes a sample manipulation device, in which the actual position is determined with the aid of a position measuring unit configured as a microscope.

According to DE 10 2007 046 267 A1, the spatial position of the cell object in a sample holder is captured by means of an image recording unit and an image evaluation unit, and a capillary is displaced first into a calibration position and then into a position above the cell object.

A general desideratum in examinations is that of keeping the consumption of sample material and further substances used during the examination as low as possible, and this can be achieved as a matter of principle by way of a miniaturization of the microtiter plate.

However, the capillary forces undesirably increase as a consequence of the miniaturization on account of the reduced internal diameter of the wells and the capillary used for aspiration, provided the capillary should be immersed in the well, i.e. have smaller external dimensions than the clear width of the well or cavity. According to U.S. Pat. No. 10,101,276 B2, this problem can be circumvented by virtue of the capillary not being immersed in the well but by cells rising up on account of turbulence and then being aspirated.

To limit the height increase, a capillary according to DE 100 39 195 A1 has a ring-shaped hydrophobic coating on the inner wall, in order to exactly meter the fluid and limit the volume that is aspiratable, in particular to be able to implement this in self-setting fashion. The hydrophobic coating can consist of various suitable hydrophobic materials, for example based on silicone and/or beeswax.

Further, a glass capillary according to DE 103 34 164 A1 has both an internal diameter in the region of the tip of less than 10 μm and a polymer coating with biomolecule-rejecting properties at the tip.

SUMMARY

Embodiments of the present invention provide a device for examining and/or treating a sample. The device includes, within a common treatment space, at least one dispensing unit for dispensing the sample into at least one sample holder comprising a plurality of wells. Each respective well has a respective opening and a base area. The device further includes an optical examining unit comprising an image sensor, a microscope, and/or an objective, a removal unit for removing the sample from the at least one sample holder and for depositing or outputting a previously isolated sample, and at least one receptacle for moving the at least one sample holder into different work positions within a work region in the treatment space delimited by a respective well of the sample holder. In a respective work position, the optical examining unit, the at least one dispensing unit, and the removal unit are positioned within the work region coaxially on opposite sides of the at least one sample holder along an optical axis of the optical examining unit. The base area of each respective well is transparent such that an optical capture of the sample is implemented through the base area.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 13*a* to 13*f* show a sectional illustration of different cross-sectional shapes of the wells in the sample holders according to some embodiments;

DETAILED DESCRIPTION

Figure 1:
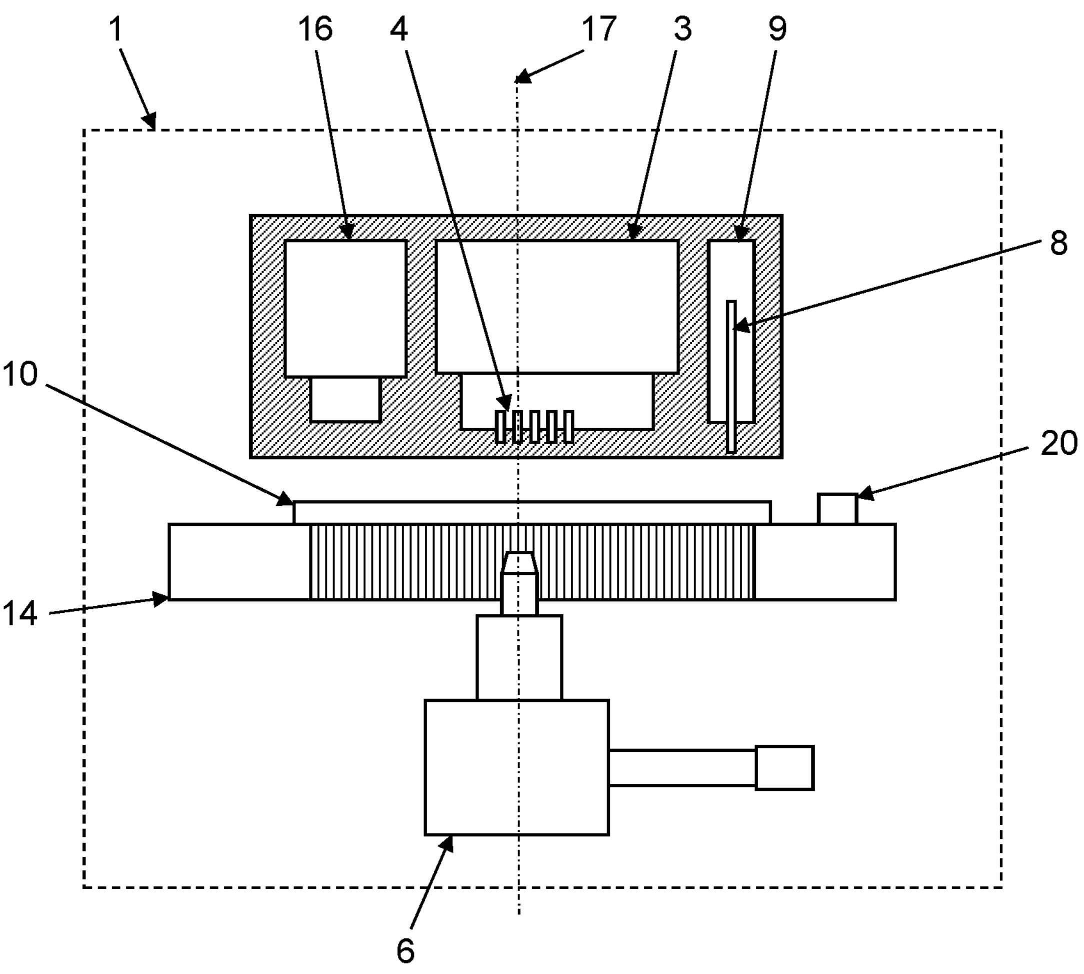
FIG. 1 shows a cut side view of a device according to embodiments of the invention in a printing position.
Figure 2:
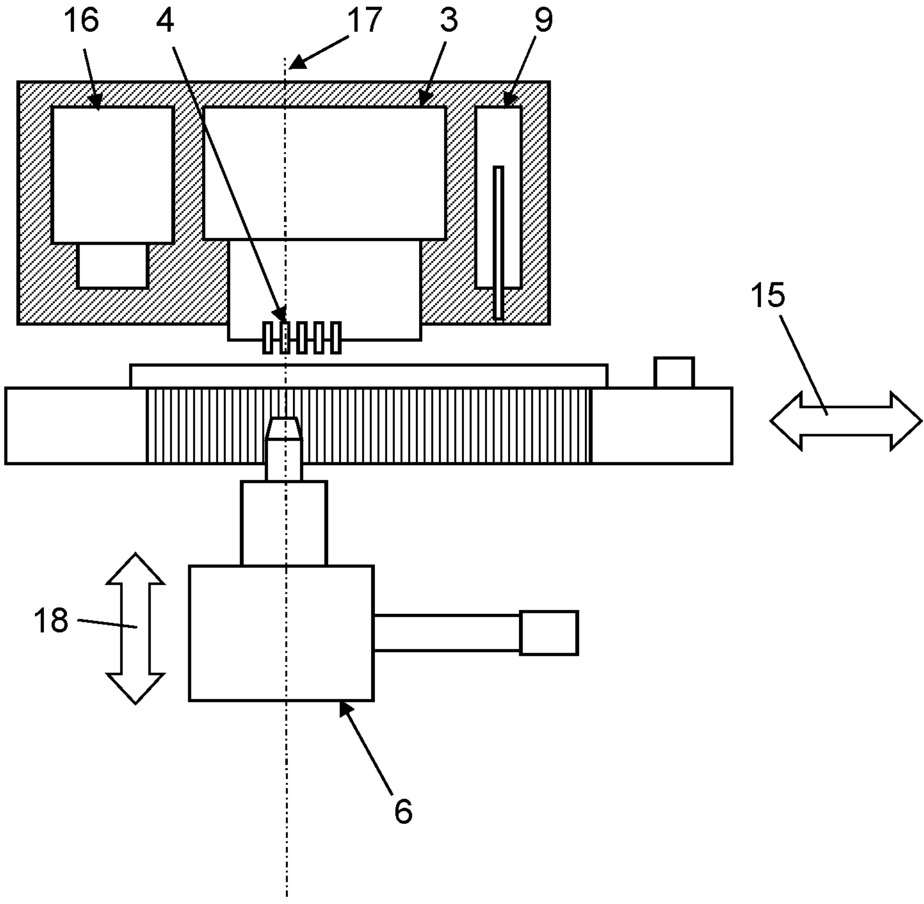
FIG. 2 shows a cut side view of the device in a further printing position according to some embodiments.
Figure 3:
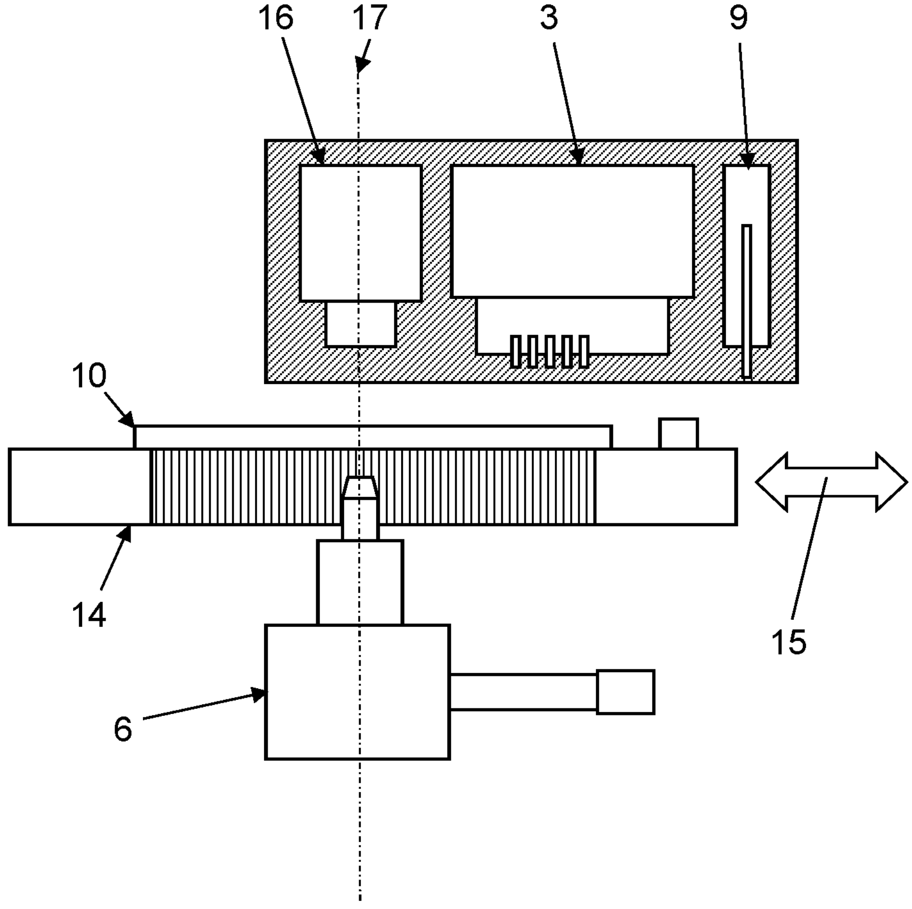
FIG. 3 shows a cut side view of the device in an illumination position according to some embodiments.
Figure 4:
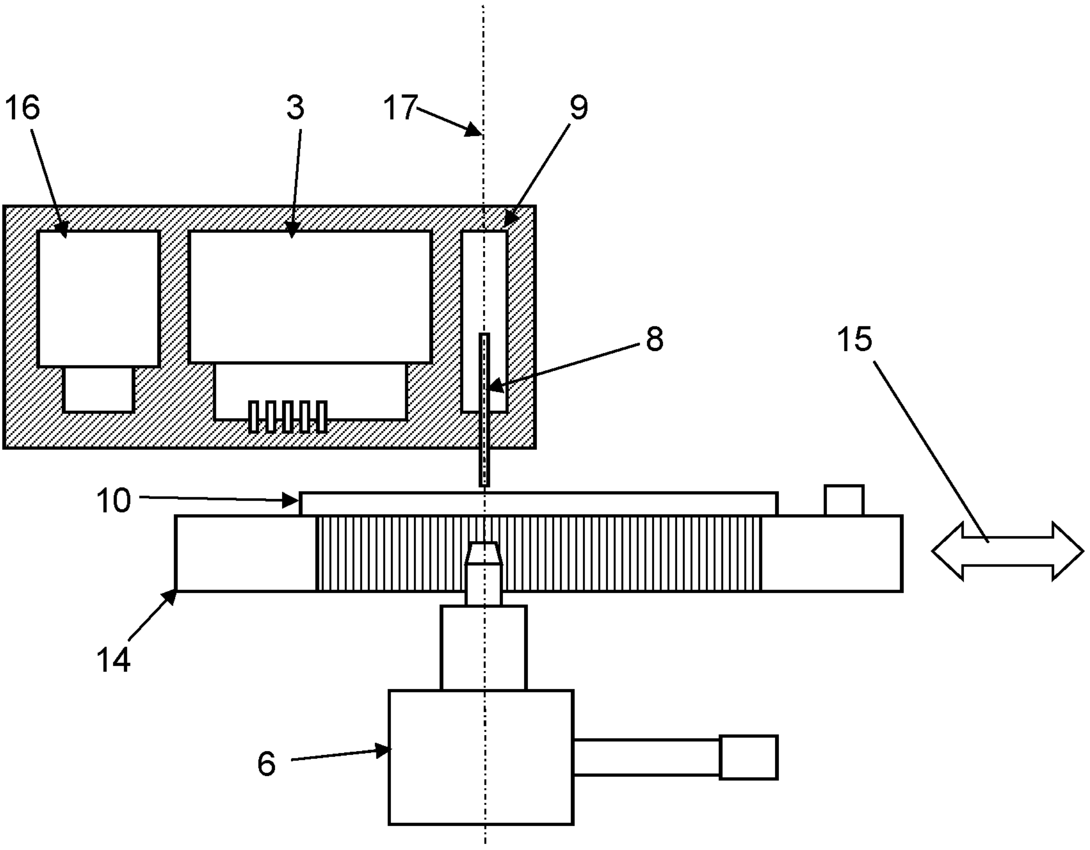
FIG. 4 shows a cut side view of the device in a removal position according to some embodiments.
Figure 5:
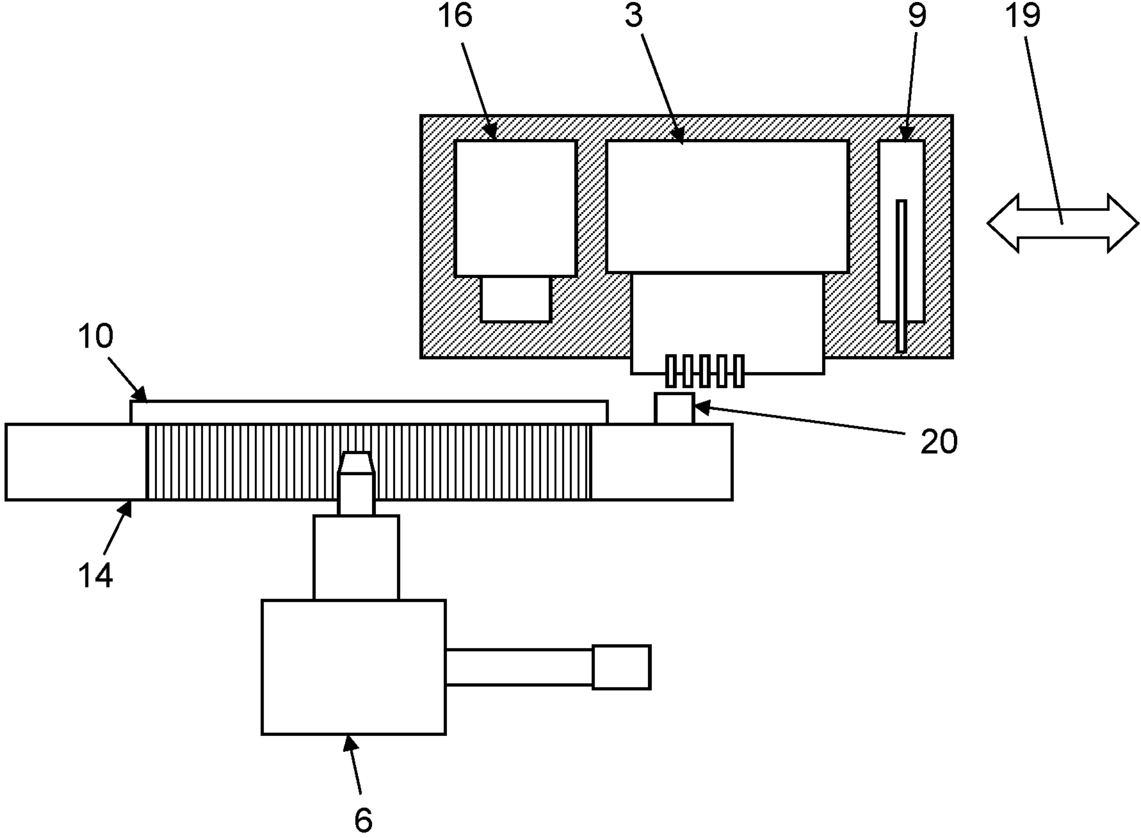
FIG. 5 shows a cut side view of the device in a calibration position according to some embodiments.
Figure 6:
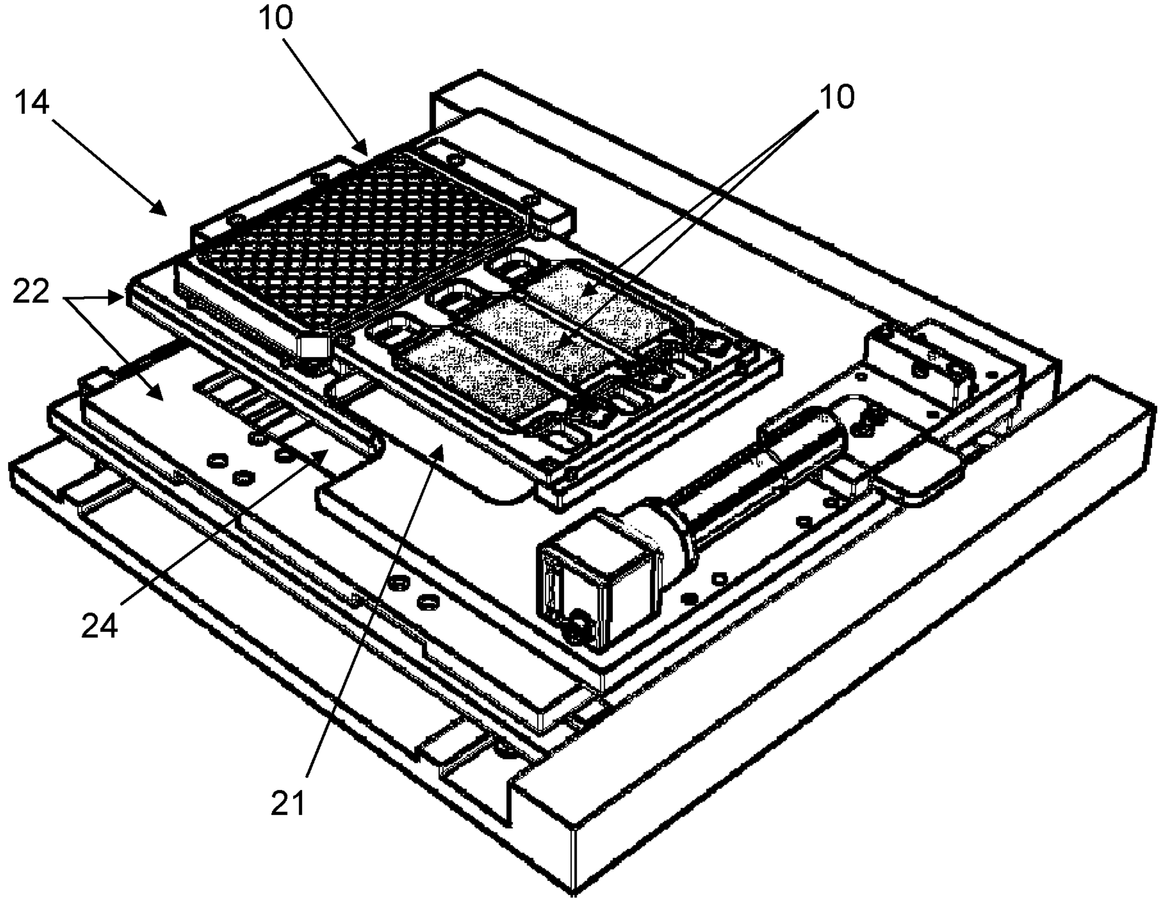
FIG. 6 shows a perspective illustration of the device with a sample holder according to some embodiments.

Embodiments of the invention provide a device and a method of providing a multiplicity of samples, in particular isolated samples, in particular also individual cells, within a sample holder, of manipulating and examining said samples and of purposefully removing individual samples from the sample holder all within an integrated and largely automated process, wherein the expenditure of time for conducting the process, the data capture, data processing and control outlay linked to the examination and the consumption of reagents, chemicals and other consumables are substantially reduced in comparison with the previously used devices and methods.

According to embodiments of the invention, a device and a method are provided for examining and/or treating a sample, in particular a biological or medical sample, for example cells, including living cells, and/or particles, wherein the device within a common treatment space comprises at least one dispensing unit for dispensing the sample into at least one sample holder comprising a plurality of wells with a respective opening and a base area, an optical examining unit, in particular having an image sensor, a microscope and/or an objective, and a removal unit for removing at least one sample from the sample holder and for depositing or outputting the previously isolated sample. Within the treatment space and by means of at least one receptacle movable within a horizontal plane, at least one sample holder is movable into different work positions situated within a work region delimited by a respective well in the sample holder, and in that in the respective work position the optical examining unit on the one hand and the dispensing unit, the removal unit and/or a selectable further unit (tool) on the other hand are positioned coaxially on opposite sides of the sample holder such that the optical axis of the optical examining unit is situated within the work region, wherein at least individual wells have an at least sectionally transparent base area such that the optical capture of the sample is implemented through the base area, wherein at least a substantial proportion of the wells in the sample holder have an aspect ratio of height of the well vis-à-vis diameter or edge length of the opening of greater than 1, and in that the referencing for positioning by means of the control unit is implemented on account of the sample holder captured by means of the optical examining unit and/or on account of the respective sample.

In contrast with the prior art, in which the sample holder is arranged stationarily and the units forming the tools are successively moved into the respective work position in a temporal sequence in order to successively carry out different process steps, the sample holder is moved, for example by means of a cross table of the receptacle, according to embodiments of the invention, wherein a continuous, uninterrupted observation of the sample is achieved in the work position set thus, and optionally a correction value is determined in respect of the captured position of the sample within the well or else in respect of the sample holder within the receptacle and therefrom a correction of the work position is undertaken where necessary. According to embodiments of the invention, mobility of the tool following the completion of the work cycle is possible and advantageous, especially for a tool change.

Contrary to the prevailing prejudice in the art that on account of the acceleration during the movement of the sample holder the sample contained in the respective well is also set in motion and therefore can only be captured or examined with increased outlay, it was found that if the aspect ratio (depth to width) according to embodiments of the invention of the wells of greater than 1 is observed in conjunction with the use of so-called well plates as a sample holder, then on account of the small volume within the well there is in practice no unwanted movement of the contained sample caused by the positioning of the sample holder. What is more, it was found that the sample does not leave the well with a very high probability despite the acting dynamic forces.

A well plate is preferably used as a sample holder and preferably consists of glass or consists of a plastic, preferably a transparent plastic (polycarbonate, polystyrene, cyclic olefin polymer, cyclic olefin copolymer, polydimethylsiloxane), or silicon or metal or a combination thereof. The well plate comprises wells which preferably have an aspect ratio (depth to width) of greater than 1 or greater than 2, 3, 4, 5, 6, 7, 8, 9, 10 or more.

The wells represent the work positions according to embodiments of the invention.

By preference, the wells can have a circular cross section or a rectangular cross section. The diameter of circular wells is preferably between 10 and 1000 μm or more, preferably 50 μm, 100 μm, 200 μm, 300 μm, 400 μm, 500 μm, 600 μm, 700 μm, 800 μm, 900 μm or 1000 μm. The depth of the wells is preferably between 20 and 1100 μm or more, preferably 50 μm, 100 μm, 200 μm, 300 μm, 400 μm, 500 μm, 600 μm, 700 μm, 800 μm, 900 μm, 1000 μm or 1100 μm.

The wells preferably have a center-to-center spacing of 105%, 110%, 120%, 130%, 140%, 150%, 160%, 170%, 180%, 190%, 200%, 300%, 400% or 500% or more of the diameter or edge length. The distance from the edge of one well to the closest edge of an adjacent well is preferably 2 μm, 5 μm, 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm or 1000 μm or more. The density of the wells is preferably between 0.25 per $mm^2$ and 6944 per $mm^2$, preferably 0.5 per $mm^2$, 1 per $mm^2$, 5 per $mm^2$, 10 per $mm^2$, 20 per $mm^2$, 30 per $mm^2$, 40 per $mm^2$, 50 per $mm^2$, 60 per $mm^2$, 70 per $mm^2$, 80 per $mm^2$, 90 per $mm^2$, 100 per $mm^2$, 200 per $mm^2$, 300 per $mm^2$, 400 per $mm^2$, 500 per $mm^2$, 600 per $mm^2$, 700 per $mm^2$, 800 per $mm^2$, 900 per $mm^2$, 1000 per $mm^2$, 2000 per $mm^2$, 3000 per $mm^2$, 4000 per $mm^2$, 5000 per $mm^2$, 6000 per $mm^2$.

In this case, the well plate made of glass, in particular produced by the LIDE (laser-induced deep etching) method known per se, has optimal optical and inert properties such that the examination, especially by means of optical methods, is substantially improved. This creates the option of an error-free capture of the samples through the base area of the well. The well plate made of glass can also be produced by laser drilling, wet or dry etching, for example plasma etching, ultrasound drilling, sandblasting, lithographic methods, etc.

The processing methods can be combined with bonding methods such as anodic bonding, fusion bonding, bonding by means of PDMS or other adhesive methods.

One exemplary embodiment of a well plate is a glass plate made of borosilicate glass with a thickness of 450 μm and through holes with a diameter of 200 μm, the glass plate being connected to a second glass plate made of a borosilicate glass by means of fusion bonding. The second glass plate serves as base of the wells. For example, the second glass plate has a thickness of 300 μm and is ground and polished down to a thickness of 175 μm post bonding. Alternatively, a silicon layer can be vapor deposited on the second glass plate, for example by means of CVD methods. The glass plates can subsequently be connected by means of anodic bonding.

A further exemplary embodiment of a well plate consists of a silicon plate with an initial thickness of 500 μm, into which through holes were introduced by means of the Bosch method (deep reactive ion etching) and which is connected to a glass plate made of borosilicate glass by means of anodic bonding. The through holes have a diameter of 300 μm, for example. For example, the glass plate has a thickness of 175 μm.

Alternatively, the plates can be connected by adhesive bonding or a PDMS layer.

A further exemplary embodiment of a well plate consists of a glass plate with a thickness of 550 μm with through holes as wells, the glass plate being connected to a second glass plate with a thickness of 175 μm, wherein both glass plates are connected to a plastics body by means of adhesive bonding, wherein the plastics body has an opening which leaves the through holes in the first glass plate clear. The glass plates with the wells form the base of the plastics body. For example, the diameter of the wells is approximately 100 μm. Instead of one opening, the plastics body can have a plurality of openings. For example, the plastics body can be a microtiter plate without base, which preferably has 6, 12, 24, 48, 96, 384, 1536, 3456 openings.

The well plates can have a base area of the order of a microscope slide with a width of 25 mm and a length of 75 mm. For example, such a well plate consists of a glass plate with wells or of two or more connected glass plates with wells. Alternatively, such a well plate consists of a plastics body, to which a glass plate or a laminate of a plurality of glass plates with wells as bases has been connected.

A further exemplary embodiment of a well plate consists of a plastics body with a circular base area with a diameter of 35 mm, made of two plastics parts adhesively bonded to one another. The upper part has four openings which leave the second plastics part exposed. The second plastics part has wells with a diameter of 100 μm and a depth of 250 μm. The plastics parts are manufactured individually by means of injection molding.

A further exemplary embodiment of a well plate consists of two glass plates that are connected to one another. The upper glass plate has through holes as wells with a diameter of 300 μm. The upper glass plate has a thickness of 450 μm. The lower glass plate has channels which connect centers of the wells in pairwise fashion. The channels have a width of 10 μm and a triangular cross section with an opening angle of 60°.

Embodiments of the invention start from the premise of miniaturizing the utilized sample holders, in particular microtiter plates, and of overcoming the known disadvantages thus. According to embodiments of the invention, this achieves a small consumption of carrier fluid or need for chemicals, an overall reduced base area of the treatment space or of the device and measurements of the well with dimensions of the order of the size of microorganisms. As a result of the holding space for the sample thus already reduced for structural reasons and in conjunction with the observation of the sample through the base area of the well being possible at all times, it is possible to drastically reduce unnecessary image capture and data processing of those image data without relevance to the examination, i.e. in particular regions without the sample, in order thus to avoid the aforementioned economic and technical disadvantages relating to the examination and treatment of individual cells. Hence embodiments of the invention unify the required high quality, the biological inertness and the economic aspects important for mass examinations.

In contrast with the prior art, the device according to embodiments of the invention allows dispensing, in particular the printing of cells or reagents, with previously unattainable precision which, moreover, is documentable throughout on account of visual monitoring being possible at all times. While apparatus-to-apparatus compatibility is often not a given for known apparatuses, the method according to embodiments of the invention and the devices bring about the preconditions for dispensing the samples in the provided wells with sufficient speed and in automated fashion, for conducting the optical capture and examination and for isolating the sample, in particular living cells, with significantly reduced interference.

Hence, the device should be understood to be an integrated system for isolating and examining the individual cells isolated on the sample holder, and for optional manipulation and subsequent isolation of the cells, in particular by being taken out of the well and deposited on the same or another sample holder.

The device is preferably applied for cell line development, synthetic biology, examining immunologically relevant cells (e.g. screening of antibody-producing cells, examining natural killer cells in interaction with tumor cells), screening the effect of medicaments on cells (drug screening, drug repurposing), transcriptome analysis, producing DNA libraries, transfection and transduction experiments, examining the interaction of different cell types with one another with and without direct physical contact (co-culturing) and other biological and medical applications.

Especially due to selective dispensing, embodiments of the invention in this case open up the option of varying the cell types, nutrient solutions, reagents and active ingredients in different wells.

In this case, the device according to embodiments of the invention is accompanied in particular by the use of a well plate and one or more processing heads for illuminating and/or printing and/or aspirating the sample by virtue of the well plate being produced with the greatest accuracy and very small tolerances and hence its position being reliably detected by means of an optical sensor of the device. By preference, use is made of a processing head containing all functions.

Moreover, the small tolerances obtainable by the well plate open up the preconditions for a further miniaturization for the purpose of a further reduction in the possible holding space of the sample, and also in the required volumes of a carrier substance.

The sample typically consists of cells, e.g. bacteria, yeasts, animal cells, plant cells, and/or of biologically relevant molecules, e.g. proteins, antibodies, DNA, RNA, and/or biomarkers, e.g. fluorescent dyes, antibodies, antigens suspended in a fluid. The fluid typically consists predominantly of water and may additionally contain nutrients, e.g. sugar, amino acids, and/or growth factors, and/or antibiotics.

Apart from biological or medical samples, the sample may also consist of particles, for example also of growth bodies, or contain such particles. These particles are suspended in a fluid medium, usually water and other contents, and may consist of plastic or glass, have a diameter of 1 μm to 50 μm and optionally have a coating that binds biomolecules, for example silanes, antibodies or other protein structures.

The sample may contain living cells. For example, mammal cells are CHO, HEK, immune cells such as B cells, T or NK cells; furthermore bacteria and yeasts. Such cell types can be modified or degenerate (tumor cells), naturally or by genetic engineering. Furthermore, this can also relate to hybrid forms of different cell types, for example as a result of somatic fusion, or else cells containing antibody-producing B cells with tumor cells, for example according to the hybridoma technique. These cells are suspended in a medium which may contain as essential constituents water and/or a cell nutrient medium and/or buffer solutions and/or reagent solutions. By preference, the suspension contains at least 70% living cells. The cell concentration is at least 1000 cells/mL and at most 2 000 000 cells/mL or more. The proportion of cell clusters is no more than 10%, 20%, 30%, 40% or 50%. In terms of diameter, no cell contained is 2-times, 3-times, 4-times, 5-times, 6-times, 7-times, 8-times, 9-times or 10-times larger, or even larger, than the diameter of the smallest cell.

By preference, different cells can be printed in wells, for example tumor cells in combination with NK cells in the same wells, or different cell types can be printed into adjacent wells, which for example are connected by way of channels, in the case of co-culturing.

According to an advantageous embodiment of the invention, the device is equipped with a processing head which is attached above the sample holder to a movement shaft that is independent of the movable receptacle for the sample holder, in particular the cross table. As a result, the processing head can reach the processing position and the position of a drop calibration station and an input/output position. The device may have further positions for the processing head, for example a cleaning station, a disinfection station, a temperature-control station, a tool exchange station, a pipette exchange station, a cannula exchange station, a coating station, a dry station, an inspection station, a measuring station. In this case, the receptacle for the sample holder is preferably independently movable in a plane in the direction of two axes by means of associated drives. This plane can be moved along a further axis that is orthogonal to the plane.

The shafts are all or in part mounted on granite whose properties (no internal stresses, good damping properties, very stable over changing temperatures) allow a constant procession of the shafts.

The dispensing unit may comprise a printing device for in particular drop-by-drop dispensing of the samples into the sample holder. By preference, the printing process can be triggered by a piezo element or a solenoid element, wherein either at least one piezo element acts directly on the volume of the print solution containing the sample or forming the latter or a piezo element or solenoid element moves a plunger that acts on the volume of the print solution and thus leads to drop formation and detachment.

The processing head may comprise a capillary for aspirating fluids, for example from wells of the sample holder or other containers.

After the printing process has been completed, the user can select the wells to be subjected to further work. For example, these may be exclusively samples from those wells containing exactly one cell or a range of a plurality of cells, for example 2 to 5 cells, or other desired compositions, e.g. a specific number of one cell type in combination with a second number of another cell type. By preference, this criterion is satisfied by 10%, 20%, 30%, 40%, 50%, 60%, 70%, 80%, 90% or 100% of all the wells present on the well plate.

According to another embodiment, the examination or treatment is only continued with cells having a certain minimum or maximum size, shape and/or structure, or a range of these values, as determined by means of the optical examining unit.

Further, the examination or treatment can be restricted to cells that have adhered or have not adhered. In the process, it is possible to choose a reaction duration time, within which the cells need to have adhered or not, for example at least 12 or 24 hours.

Unlike what was conventional to date, it is advantageously possible in a process step following the dispensing to use samples from such wells which contain deviating amounts of cells or whose roundness, size or another property does not correspond with the desired profile. For example, this also allows the creation of comparison samples which can assist with uncovering changes in the reagents which are not caused by cells or which are introduced by unnoticed contamination.

Should printing be carried out according to the dilution principle (Poisson distribution) and, in each printing cycle, cells be distributed statistically in wells or wells remain free, it may be advantageous not to refill empty wells as often as possible but instead leave a predetermined number of wells empty, for example 1% or 5% or 10% or more of the wells or, in total, 10 or 100 or 1000 or 10 000 or more wells. In this way it is possible to conduct experiments, for example for comparison purposes, which highlight changes without cells or contamination. Moreover, it is possible to register the accuracy with which cells are detected or not detected, e.g. by virtue of the wells being analyzed anew after a predetermined period of time and deviations being evaluated. In a subsequent scan, these false-negative wells might indicate cells since the latter have changed their position, have become larger or have divided, and hence have become more in number and are able to be detected more easily. Furthermore, this procedure for example also highlights technical problems, for example turbulence which causes cells to undesirably reach empty wells, or convection due to heating which causes cells to float.

In an embodiment, this verification is used to check the validity of a conducted experiment. To this end, wells previously identified as empty are analyzed following the experiment. Should cells be found in such wells, this indicates that errors occurred when the experiment was conducted. This could be due to an incorrect first analysis (cells overlooked) or flawed handling of the samples (cells migrate from well to well). The threshold for assessing the quality of the experiment (e.g. 0.1% of the wells originally empty contain cells following the experiment) can be defined by the user.

The dispensing unit equipped with printing heads in particular may comprise an exchangeable cartridge or a container for samples, reagents, cell suspensions, nutrient media, water or buffer solutions.

A variant of such printing heads can take up the fluids from a reservoir by means of capillary force or by negative pressure. Moreover, the printing head can be connected to a supply container by way of a tube system, with the result that the dispensing unit can be supplied with fluid by means of a pumping system. The printing head may have an exchangeable cartridge which contains reagents, a cell suspension, nutrient medium, water or buffer solution.

In practice, a drop volume of between 20 pL to 70 nL was already found to be expedient. However, the drop volume can also be up to 10 μL or more. For example, the drop volume can be determined optically by observing the drop diameters.

Furthermore, the optical sensor for detecting the drop volume can be used to control the parameters of the dispensing unit, in particular of the piezo controller, in such a way that satellite drops, spraying, non-attachment of the drop or other unwanted effects are largely avoided. The optical sensor is part of the drop calibration station. As optical methods, use can be made of imaging of the drop, the Fraunhofer diffraction method, the laser Doppler method or other interferometric methods, Mie theory-based methods or Lorenz-Mie theory-based methods. The drop volume can be determined using a capacitive sensor or a flow sensor. Alternatively, the optical methods can be combined with weighting methods.

Important influencing variables of the piezo deflection on the printing process of the dispensing unit are the absolute deflection, the speed of the deflection and the time profile of the voltage applied to the piezo. The influencing variables can be controlled if satellite drops or similar effects are detected and/or if no drop detachment is detected.

In this context, it was found to be advantageous for the dispensing unit, in particular the printing head, to be positionable relative to the sample holder at different vertical positions, wherein a change in position is not precluded during the sample treatment either. Prior to the printing process, the unused printing heads or selected printing heads can be raised up in order to increase the distance from the sample holder. Alternatively, the printing heads required for the printing process can be extended in order to reduce the distance from the sample holder. Additionally, selected printing heads can be displaced parallel to the plane of the sample holder prior to the printing process. By preference, all printing heads are mounted to a device whose distance from the sample holder can be adjusted.

Drops can be printed with a certain offset even though the dispensing unit with its outlet opening designed as a nozzle for example and the optical examining unit equipped in particular with an objective are aligned coaxially or perpendicular to one another. Said offset might be negligibly small or might need to be corrected. To this end, a drop can be dispensed to a surface located in a common plane with the opening of the well or into a well. The optical examining unit, in particular a microscope, is used to optically capture the offset in the x- and y-direction, and a correction value for positioning the sample holder is measured. The measurement can be conducted outside of the apparatus. The sample holder is subsequently displaced to the corrected position. Alternatively, the printing head can be used for the correction in one direction, and the cross table can be used for the correction in the orthogonal direction.

To correct the offset, one drop can be dispensed into a well of the sample holder, and a change in the optical properties, e.g. transparency, of this well can be detected. Should the optical change not occur, a correction is undertaken in x and/or y, and the process is repeated. Typical increments in x and/or y are for example 10 μm, 20 μm, 30 μm, 40 μm, 50 μm, 100 μm or more.

Alternatively, a drop can be dispensed at the position of a well for the purpose of correcting the offset. Should the drop not be detected in the well, a routine can be executed, wherein the offset is initially modified by a proportion of the diameter or edge length of the well (e.g. 10%, 20%, 30%, 40%, 50%, 60%, 70%, 80%, 90%, 100% or 150% of the diameter or edge length), to be precise in any order along the x-axis, y-axis and/or diagonally, wherein the increments in the direction of the x-axis and the y-axis may differ, and a drop is dispensed following each positional change. The increment of the positional change can be increased (increase of the increment for example 10%, 20%, 30%, 40%, 50%, 60%, 70%, 80%, 90%, 100%, 150% or 200% of the diameter or edge length) should the drop not be detected in the well following a positional change. Subsequently, there can be a renewed check as to whether the drop is detected in the well, and the method can be repeated until a termination criterion has been satisfied (e.g. a drop is detected in the well or a specified number of positional changes has been exceeded).

Additionally, each positional change can be followed by a comparison between the position of the dispensed drops and the position of the center of the well or the edge of the well. In that case, the termination criterion of the described routine can be the smallest distance between a drop position and the position of the well or the largest distance between the drop position and the position of the edge of the well. Furthermore, other geometric features on the sample holder can be used as a criterion for correcting the offset.

Alternatively, a drop can be dispensed into a well. The microscope measures the offset in the plane of the base of the well in terms of x and y, and corrects the position of the sample holder by this value.

Alternatively, cross structures or lines with known dimensions might have been introduced on the surface of the substrate or on the base of the wells. The offset between the drop and these structures can be determined after a drop has been dispensed. The cross structures can have a distance from one another of 10 to 50 μm, for example 10 μm, 15 μm, 20 μm, 25 μm, 30 μm, 35 μm, 40 μm, 45 μm or 50 μm.

The above-described structures for determining the offset, in particular wells, cross structures and/or lines, can have an edge length of between 100 μm and 1 mm or more, preferably 100 μm, 200 μm, 300 μm, 400 μm, 500 μm, 600 μm, 700 μm, 800 μm, 900 μm or 1000 μm or longer.

By preference, the diameter of the drops dispensed by the dispensing unit is at least 2%, 5%, 10%, 20%, 30%, 40% or 50% smaller than the diameter of the wells or the shortest edge length of the wells.

Alternatively, a combination of different movements of the dispensing unit and the receptacle of the sample holder may be provided for correction purposes.

The optical examining unit can serve to conduct various microscopy techniques, comprising bright-field, dark-field, phase contrast and (epi-) fluorescence microscopy. The optical examining unit preferably comprises a digital camera which detects in the wavelength range from 380 nm to 780 nm. Further, it comprises an objective, preferably with 5×, 10×, 20×, 40× magnification. The optical examining unit furthermore comprises an illumination unit preferably comprising white LEDs and/or LEDs with emission in the UV and visible spectrum. Excitation wavelengths at 375 nm, 490 nm and/or 590 nm are preferably used for fluorescence microscopy.

The processing head preferably comprises an illumination as a tool. This illumination can preferably be used for bright-field microscopy.

For the optical examination of the samples in the respective well through the base area of the latter, the receptacle for example equipped with a cross table may comprise an opening or an optically transparent support face for the sample holder.

The distance between objective and sample holder can be modified for the optical examination or microscopy step and the scanning of the wells, in order to image different planes in the wells. In this case, the change in distance can be implemented in 15 nm to 100 μm increments. Alternatively, it is possible to use an electrically tunable liquid (ETL) lens for modifying the focal length of the optical examining unit and thus imaging different planes in the well.

The microscope can preferably image a rectangular field of view of 0.21 mm*0.18 mm or 2.8 mm*2 mm, or a smaller or larger field of view. Fields of view can have a square area or other ratios of edge lengths. Depending on the magnification set, a plane in a well can preferably be imaged in full in the field of view. Alternatively, a plurality of wells can be imaged, preferably at least 4, 12, 20, 35, 54, 140, 560, 2240 or 10 000 or more.

The device can have an input/output position, at which a reservoir is positioned. The reservoir comprises containers in which fluids can be provided. The reservoir can be a conventional microtiter plate or have other formats, for example the base area of a microscope slide or round formats with diameters of 35 mm, for example. The containers can contain samples, for instance reagents or cell suspensions, which can be taken up by printing heads of the device. Using the capillary, the content can be removed from the wells of the sample holder and dispensed into the containers.

In a practice-oriented embodiment of the invention, the sample holders comprise plastic, for example COP, COC, PS, PMMA, POM, PC, glass, silicon or a combination of these materials at least as substantial material component.

Glass has ideal properties: It is optically transparent, chemically inert but can be surface treated using known methods (plasma treatment, silanization, coatings), fluid-tight and electrically nonconductive, which is advantageous for the use of sensors. However, it can be coated (selectively) and thus be rendered (selectively) conductive.

Known methods include metallization by vapor deposition (this is (partially) selective if masks are used) using the physical vapor deposition (PVD) methods. Chemical metallization by seeding with e.g. palladium and subsequent electroless plating or by printing with metal-containing fluids or pastes also comes into question. Semiconductors can be vapor deposited (selectively) using e.g. chemical vapor deposition (CVD) methods. In this case, silicon and its compounds, in particular, are used.

The sample holders, in particular their surfaces, can optionally be treated by means of plasma treatment, preferably with a high oxygen content in the gas, or a wet-chemical method, for example etching with NaOH, KOH or strong acids such as HNO3, sulfuric acid, phosphoric acid, in order to make these more hydrophilic and hence better wettable. In particular, this is achieved by contact with the chemicals at temperatures greater than 40° C., greater than 50° C., greater than 60° C., greater than 70° C., greater than 80° C. or greater than 90° C. In this case, the duration is between one minute and several hours. Various methods are known for manipulating the surface properties with regards to wettability or for promoting/countering the adhesion of cells to the surface. A plasma treatment typically makes surfaces more hydrophilic; silanization for example with alkylsilanes or fluoroalkylsilanes makes the surface hydrophobic. These treatments can be used to make the surface more or less wettable with polar solvents such as water. To control the adhesion of cells, coatings with poly-L-lysine, poly-D-lysine, poly-ornithine, gelatines, collagen, fibronectin, laminin, vitronectin, osteopontin, in particular, have proven their worth. Typically, the cell surfaces are negatively charged, which is why negatively charged or hydrophobic coatings make an adhesion of cells more difficult or even prevent this.

The size of the sample holders can vary and in terms of the base area can for example be between 1 $cm^2$ and 0.1 $m^2$ or larger.

The wells can be cylindrical or conical according to a preferred variant, with an inclination angle (taper angle) of the wall surface vis-à-vis the normal of the cross-sectional plane of between 1° and 30°.

Furthermore, the depressions can have a plane base area or regular or irregular structuring with conical or spherical substructures.

A fluid film or supernatant may be situated above the cell-containing fluid or sample in the wells, the height of which is at least 10 μm to 100 μm, preferably 100 μm to 1 mm, to 2 mm, to 3 mm, to 4 mm, to 5 mm, to 6 mm, to 7 mm, to 8 mm, to 9 mm, to 10 mm or more. In this case, the optical examination through the transparent base area is restricted to the sample such that the examination does not impair the forming meniscus. In particular, when scanning the wells vertically, the examination can be terminated before the meniscus is reached.

Optionally, all wells or groups of wells have such supernatant fluid. This supernatant can be formed by a glass, silicon, metal or plastic frame. The frame can be adhesively bonded or connected by means of fusion bonding (glass-glass) or by means of anodic bonding (glass-silicon) or clamped by means of a rubber frame. As a result, the meniscus can form at a greater distance from the upper edge of the well and/or have a larger radius (since the diameter of the frame is always larger than the diameter of the well) and/or be shaped convexly, for example if the bounding material is hydrophobic (plastic, rubber, coating). This leads to a significantly smaller influence of the meniscus on the microscopic imaging of the sample.

The capillary is an elongate hollow body made of glass, plastic or stainless steel. It is preferably connected to a negative pressure-creating unit. A negative pressure-creating unit can be a pump or a displaceable plunger which creates negative pressure by way of being pulled out in motor-driven fashion. Alternatively, negative pressure can also be created by way of potential energy or a volume increase due to change in temperature.

The external diameter of the capillary in the region of the opening is smaller than the internal diameter of the wells from which the content should be isolated, with the result that the capillary can be immersed in the well.

Since the samples are immobilized in the wells on account of the aspect ratio (depth to width) according to embodiments of the invention of more than 1, there is no risk of the movement of the capillary in the medium within the well undesirably displacing the cell to be isolated or a cell to be isolated at a later stage. It is for this reason that even non-adhering cells can be isolated on the basis of a database created during the microscopy process and the subsequent analysis of the images.

It has already been found that it is possible to manage without controlling or positioning the capillary by means of the optical examining unit because the position of the cell is sufficiently well known as a result of the well. The procedure of removing the content from the predetermined well by means of the capillary can be conducted substantially more quickly as a result.

The relative positioning of the removal unit, i.e. of the capillary in particular, is already sufficient if the latter is located within the field of view of the optical examining unit. Fine positioning is achieved by virtue of the removal unit and well being positioned relative to one another by optical monitoring, i.e. the wells themselves being used as intrinsic reference points.

Preferably, the position of the removal unit can be displaced manually relative to the sample holder by means of an operating element, for example by software entries, or it can be positioned automatically at a start position over the well. The further positioning vis-à-vis the well is then implemented manually or in fully automated fashion again.

Another embodiment of the invention, which is likewise promising, is also achieved by virtue of the fact that the capillary is coated, in full or in part, with a hydrophobic coating, for example an alkylsilane or fluoroalkylsilane.

It is also advantageous if the capillary has a smaller cross-sectional area in a portion facing the opening than in a portion distant from the opening. In this case, the change in cross-sectional area along the main extent is preferably continuous with a linear or progressive curve. Alternatively, the capillary has a part with a large and a part with a small diameter.

By preference, the capillary is dimensioned such that it can take up at least 10%, 20%, 30%, 40%, 50%, 60%, 70%, 80%, 90%, 100%, 200%, 300%, 400%, 500% or more of the volume of the well.

Another also practical embodiment of the invention is achieved by virtue of the capillary being partly filled with a fluid that has a greater density than the carrier fluid from which the content should be isolated. For example, some fluid can be dispensed into the well when the capillary is immersed. The particles contained in the well lift off the base area as a result of the fluid. The content of the well can be aspirated more easily as a result.

The capillary is immersed into the supernatant of the fluid at a distance from the base area, to such an extent that the sample in the well is not disturbed by fluid movements. In the case of a closed capillary, the capillary can remain in this position until the aspiration action as a result of the capillary effect is compensated by the building-up counter pressure due to the compression of the air, i.e. until equilibrium sets in (priming of the capillary). In the case of an open capillary, the fluid initially rises until gravity and the capillary force are balanced. This height of increase is described by the capillary equation. Then, the well is optionally positioned in such a way that the capillary can be immersed in the sample. For aspiration purposes, a valve is opened so that the capillary continues to fill with the content of the well, or negative pressure for aspiration is created, for example by the motion of a plunger or other equipment. An open capillary needs to initially be closed-off in order to create the negative pressure, for example by a plunger. This procedure with a primed capillary ensures complete control of the aspiration speed and the prevalent forces when e.g. living cells are aspirated.

On account of the small dimensions of the wells, aspiration is influenced significantly by capillary forces within the well. The walls of the wells can be coated hydrophobically, e.g. with an alkylsilane or fluoroalkylsilane, in order to reduce the effect.

The well plate may contain at least one position for "priming" the capillary. For example, this can be a well not containing any cells or a location in the edge region, optionally without wells, or, in the case of a sufficiently large fluid supernatant over the wells, any other position satisfying the condition that the sample is not moved out of the wells in uncontrolled fashion.

The content of the capillary can be dispensed by dispensing the fluid, for example into a prepared microtiter plate, at the input/output position. In this case, it is advantageous if the capillary in the priming step has taken up a substantially larger volume proportion than when aspirating from the well. The volume during priming is preferably at least 10 times, 100 times, 1000 times larger or more. This ensures that the contained sample, situated in the lower region, is reliably flushed out and cannot come into contact with the capillary wall, for example at the meniscus of the fluid level, and adhere there such that it can only be reliably isolated from the capillary by multiple instances of rinsing.

Alternatively, a further feed line can also be attached to the upper part of the capillary in order to allow the capillary to be rinsed in the direction of the opening and thus reliably eject contained particles.

For example, the capillary can be removable from the negative pressure-creating unit by way of a luer lock or another mechanism. Such a negative pressure-creating unit can be a pump, plunger, piston or the like, which is movably drivable in order to create negative pressure.

According to a further promising embodiment of the invention, markers or structures, in particular cross structures or lines, can be attached to or provided on the sample holder, in particular on its surface or in the region of a base area of the wells, the dimensions and relative positions with respect to one another of said markers or structures being known in order thus to be able to optically capture the position of the sample holder. A possible offset when dispensing the sample can also be determined by means of these structures.

It is advantageous for the receptacle and the sample holder to have geometries that are complementary to one another and allow insertion only in a single position and/or orientation. For example, the orientation can be labeled unambiguously by markers on the sample holder and/or receptacle. The sample holder can be placed against a stop and can be locked in its position by a clamp or another mechanism.

The housing of the machine has an encapsulated treatment space which is flushed by HEPA- and/or ULPA-filtered and hence sterile air. Furthermore, UV radiation can be used for sterilization purposes. In this case, the encapsulated treatment space can be delimited either by a separate spatial volume or the volume of the entire device.

Alternatively, the housing or a separate spatial volume can be sealed from the surroundings by means of a seal. In both cases, the sealed treatment space preferably has an opening for discharging the enclosed gas volume, for example through a further HEPA and/or ULPA filter, in order to retain and/or aspirate particles such as microorganisms.

Furthermore, a sterile or purified gas, for example air, can be introduced by means of a line connection from an external gas supply unit, or it can be created as a constituent part of the device by appropriate filters and fans. For example, the gas supply unit can be connected to a housing of the device.

The pressure difference between the sterile encapsulated treatment space and the surroundings can be controlled by means of a closed-loop mechanism. When printing, performing microscopy on or isolating cells, or in the "standby mode", the positive pressure vis-à-vis the ambient pressure is up to 1 bar, or the positive pressure is limited by the filter used.

In advantageous fashion, the treatment space is gas-tightly sealed from the surroundings by at least one sealable access, in particular a door or a flap, wherein the supplied volumetric flow rate of sterile air can preferably be increased when the access is opened in order to suppress the ingress of nonsterile ambient air.

In the closed state, the door or a flap is pressure-tightly sealed by means of a seal, for example a rubber seal, Teflon seal, foam and/or inflatable hose seal.

In order to largely avoid turbulence when opening the access and effectively reduce the inflow of nonsterile air from the surroundings into the work region, the door or a flap is preferably not pivoted but moved translationally along a straight or curved trajectory, for example displaced parallel to a housing surface.

In this case, the door or a flap can consist either of a single movable element, which is displaced in full, or of a plurality of translationally movable elements. In particular, the movable elements can be moved in the same direction in a plurality of parallel planes or can be moved, in part or in full, in different directions. In practice, the passage opening can advantageously be adapted to the sample holder by virtue of all elements or only individual elements being displaced such that the size of the passage opening is adapted according to need.

The elements of the door or the flap can be moved by way of a hydraulic, magnetic or mechanical mechanism. In this case, linear shafts, linear guides and spindle shafts are advantageous in particular. The speed at which the door is moved for opening or closing purposes is preferably limited to 33 mm/s. Safety mechanisms for protecting the user are preferably used at higher speeds.

Furthermore, sensors, for example magnetic sensors, electrical contacts, travel measuring sensors, optical barriers or the like can be provided to detect whether the door or flap is closed, partly open or completely open, with the result that a control signal for the volumetric flow rate of the supplied sterile air is triggered depending on the registered state.

To create suitable conditions for cells, a further unit, in particular a climate-controlled unit, can be introduced into the treatment space, this unit including a work volume that is reduced vis-à-vis the treatment space and delimiting a sterile region including the sample holder. This unit can be equipped with dedicated feeds for a sterile or prepared gas volume. The required feeds can be led through the housing and can, for example only when necessary, be connected to the unit directly or by means of adapter pieces.

This climate-controlled unit is transparent at least in sections, in order to allow optical examination through the transparent region. Further, the possibly required illumination can be implemented through a transparent region.

The climate-controlled unit preferably consists of glass, sapphire, COP, COC, PC, PS, POM, PMMA or another transparent material. Furthermore, when not required, the unit can be removed from the work space.

An alternative connection for the feeds can be implemented through the open door. In this case, it is advantageous for these to be guided through a cover that covers the door opening and ensures darkness in the interior of the apparatus so that microscopy, especially fluorescence microscopy, is not disturbed by extraneous light, as this otherwise supplies poorer contrast values.

A further advantage of such a cover is that the volumetric flow rate of sterile air can be lower than in the case of a completely opened door.

When the door is open, the various treatment units are not in use and preferably disabled by the control unit. Attaching the cover allows use of the units, in particular the optical examining unit, and receptacle of the sample holder. To this end, both the position of the doors or flaps and the presence of the cover are detected, for example by magnetic contacts, and appropriate control signals are triggered by the controller.

The gas volume can be heated to a predetermined temperature. In practice, a gas composition of 1% to 10% of CO2 and/or 5% to 30% of oxygen and/or 90-98% of water vapor was already found to be expedient.

By preference, the field of view is only modified, i.e. displaced in terms of x- or y-position, once the optical examination has been completed over a substantial portion of the well, in particular over its complete height, or over at least 30%, 40%, 50%, 60%, 70%, 80% or 90% of the height of the well. The image data captured thus are stored with information regarding the position (x, y, z) and/or a time (absolute or relative to a certain event). The alternative procedure, specifically initially scanning one plane of all wells and then displacing the focus, harbors the disadvantage that cells can move in their wells during the scan along the plane, and flawed measurements arise.

The cross table of the receptacle of the sample holder has finite accuracy, with the result that a tolerance vis-à-vis the sample holder is unavoidable. The edges and/or centers of the wells leaving a tolerance range can be identified as a problem in this case.

Furthermore, the sample holder may comprise certain positions without wells or positions with modified wells (for example modified in terms of diameter) or positions with wells offset in the plane of the surface of the sample holder. These deviations can be used purposefully for example to identify an incorrect orientation and/or position or the insertion of an incorrect sample holder. To this end, the precise position of the field of view is verified or corrected or calibrated by comparing the image data with target values of the sample holder layout.

The images from the optical examining unit are automatically checked, at least in part, by artificial intelligence or machine learning methods for the presence of cells, the shape of cells, the size of cells, the intensity or color of fluorescence signals, cluster formation, the mobility of cells, the growth rates of cells, the reactions to external stimuli and reaction times and other features and/or the combination thereof, and this information is stored and/or processed further. A further procedure can be derived on the basis of this information, either in automated fashion, in a manner specified by the user or manually by the user.

For long-term experiments, the optical examining unit can examine certain wells for given patterns multiple times at predetermined intervals and capture image data.

Cells are typically distributed in the fluid partly or completely filling the volume of the wells, for example at the sidewalls, on the base or floating in the fluid. Thus, imaging in three dimensions is required for detecting the cells. Thus, the optical examining unit can be moved in the depth direction of the well in order to image different planes within the cell in focus.

The information regarding the three-dimensional position at which a cell or particle is situated can be evaluated from the three-dimensional imaging of the well. When the sample is taken up by the capillary, this information can be used to take up the cell or the particle.

Imaging the content of the well can be used to identify and catalog cell types in automated fashion. On the basis of this information, specific wells can be selected in automated fashion, and chosen cells can be removed in targeted fashion.

Wells can be filled with highly viscous fluid in order to suppress cell movement.

Optionally, the device can access a database to obtain information about the content of wells from earlier measurements. From this information, it is possible to derive which content should be taken up at what time and dispensed from the device. For example, such information may include the presence of certain cell types, antibodies or proteins, or growth rates of cells or other results from earlier evaluations.

Before samples are taken, the capillary can dispense fluid into the well, for example contrast agent or fluids with higher density to make the cell float. Optionally, the capillary can also dispense and aspirate in oscillating fashion, in order to whirl up cells or particles or release the adhesion from walls or the base of the well.

The capillary can be immersed into the well when samples are taken from wells. In this case, the position within the well can be detected by the optical examining unit. This detection can be used as a basis for manual steps performed by the user, for example a correction of the position of the capillary in the well.

The capillary is optionally attached to the upper end of the printing head.

The content of the capillary can be monitored, for example by the optical examining unit or a further optical unit, before, during and after the take-up of samples. Further work steps can be triggered thereupon.

During the treatment in the device, the sample holder can optionally be removed from the apparatus in order to carry out further work steps, for example centrifugation, and can be reinserted thereafter.

Depending on the user's choice, all described work steps can be conducted in automated or manual fashion.

At any given time, the user is provided with the option of manually selecting wells from which cells should be removed. Alternatively, this can be conducted in automated fashion by a routine specified by the user, the routine being used to select cells with specific characteristics.

To clean the capillary, a rinsing and/or cleaning solution can optionally be supplied through an opening above the tip of the capillary. The rinsing process thus is much more efficient and effective. Alternatively, a rinsing and/or cleaning solution can be taken up by aspiration and subsequently dispensed. Both rinsing methods can also be combined with one another.

Optionally, the temperature within the volume in the device can be controlled by a closed-loop mechanism to a range of 4° C. to 37° C., and the relative humidity can be set to values greater than 90%, for example 95%, in order to minimize evaporation.

Individual cell experiments can be conducted in automated and economical fashion in a single apparatus with a high throughput and a large number of individual experiments (1000 to >1 000 000). As a result of the very small volumes of the wells, for example in comparison with microtiter plates, expensive reagents are saved, and the small dimensions of the wells leads to a significantly smaller base area of the sample holder despite a large numbers of said wells. As a result of isolation (compartmentalization) and according to specified criteria, individual cells can be selected from large populations of more than 10 000 cells and can be compared.

A device 1 according to embodiments of the invention and the method designed to be conducted for examining or treating biological or medical samples 2 are explained in detail below on the basis of FIGS. 1 to 19. Various functional units, designed here as integral components, are arranged within a treatment space of the device 1, in this case a dispensing unit 5 equipped with a plurality of printing heads 3 and serving to dispense the sample 2, an illumination unit 16 and a removal unit 9 equipped with a capillary 8 and serving to remove the sample from a sample holder 10 and dispense or output the previously isolated sample 2, and also an optical examining unit 6 spatially separated therefrom, designed as a microscope and having an objective 7.

The sample holder 10 has a multiplicity of wells 11, depicted in FIGS. 11 to 14, with a respective opening 12 and a base area 13 and is translationally movable in the arrow direction 15 to different work positions in a horizontal plane by means of a receptacle 14 designed as a cross table. In the respective work position, the optical examining unit 6 is arranged below the receptacle 14, while the respectively active unit is positioned on the opposite side above the receptacle 14. In this work position, the optical examining unit 6, the respectively selected well 11 and one of the dispensing unit 5, the removal unit 9 and the illumination unit 16 are located coaxially on a common axis 17, corresponding to the optical axis of the optical examining unit 6, on the opposing sides of the sample holder 10. For this purpose, the base area 13 of the wells 11 is transparent such that the optical capture of the sample 2 is implemented through the base area 13.

During the treatment or examination of the sample 2, the optical examining unit 6, or at least the objective 7, is only advanceable in the direction of the sample holder 10 in the arrow direction 18, in order to be able to adapt the focal position in this way. Movement of the sample holder 10 by means of the receptacle 14 serves the examination of the samples 2 in other wells 11.

Even though the required relative movement of the sample holder 10 during operation is primarily implemented on the basis of moving the sample holder 10 by means of the receptacle 14, the selection of the desired unit is moreover provided for by a movement of these units which, in the depicted variant, are translationally displaced together in the arrow direction 19 and thus for example also able to reach a calibration station 20 (depicted in FIG. 5) for calibrating drops for the dispensing unit 5.

Figure 7:
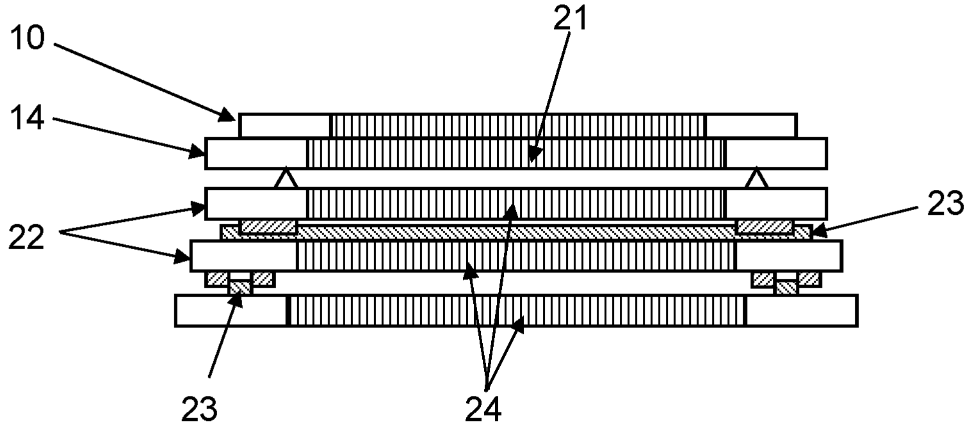
FIG. 7 shows a cut side view of a receptacle of the sample holder of the device according to some embodiments.
Figure 8:
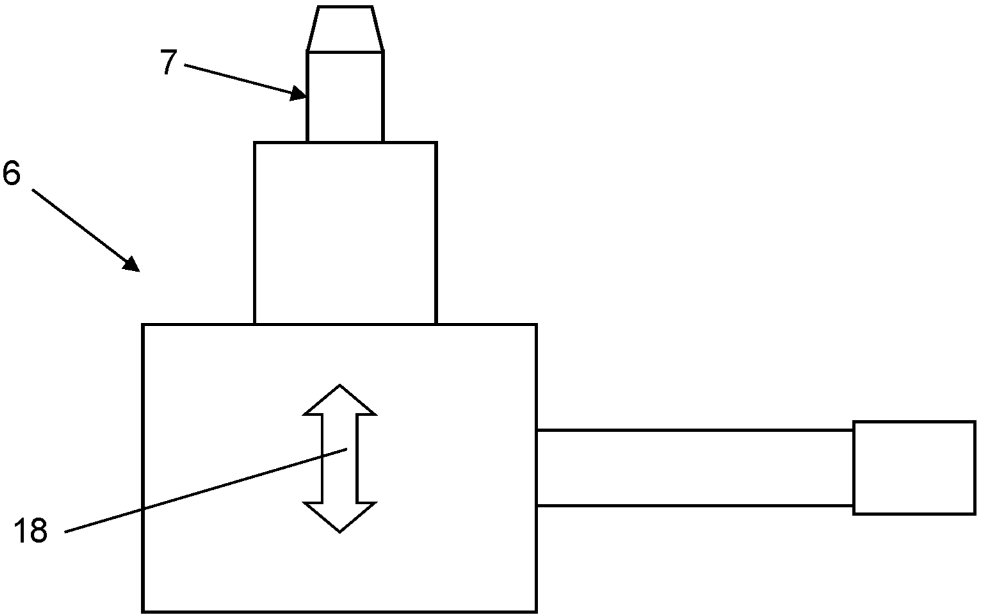
FIG. 8 shows a side view of an optical examining unit of the device according to some embodiments.

As depicted in FIG. 7, the receptacle 14 has a cutout 21 for the sample holder 10 such that the samples 2 can be captured without restrictions through the base area 13 of the well 11 by means of the optical examining unit 6 depicted in detail in FIG. 8. Accordingly, the cross table elements 22, each of which are movable on external guide rails 23, also have corresponding recesses 24.

To examine the sample 2, the optical examining unit 6 has a Z-adjustment means for advancing the objective 7 in the arrow direction 18 and also an illumination (not depicted in detail here), optical units and at least one camera.

Figure 9A:
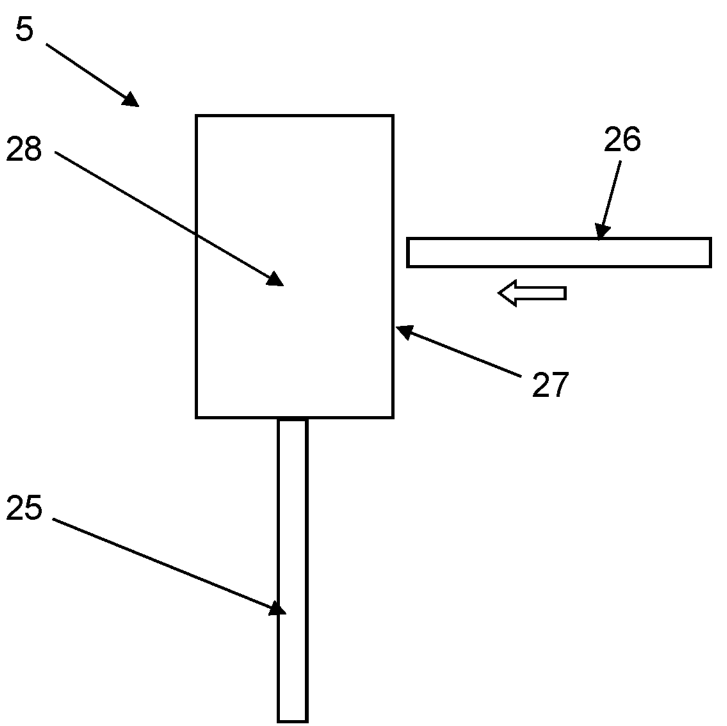
FIGS. 9*a* and 9*b* show a side view of a dispensing unit of the device according to some embodiments.
Figure 9B:
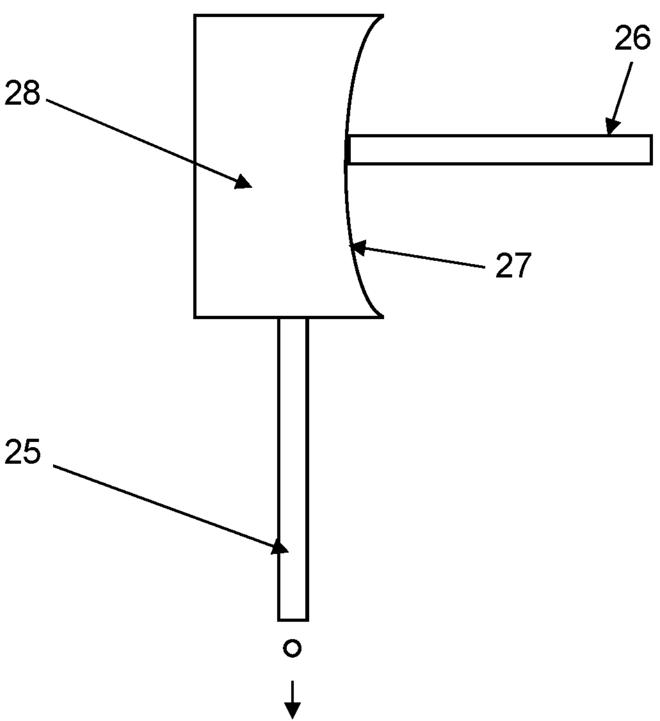
Figures 10A, 10B:
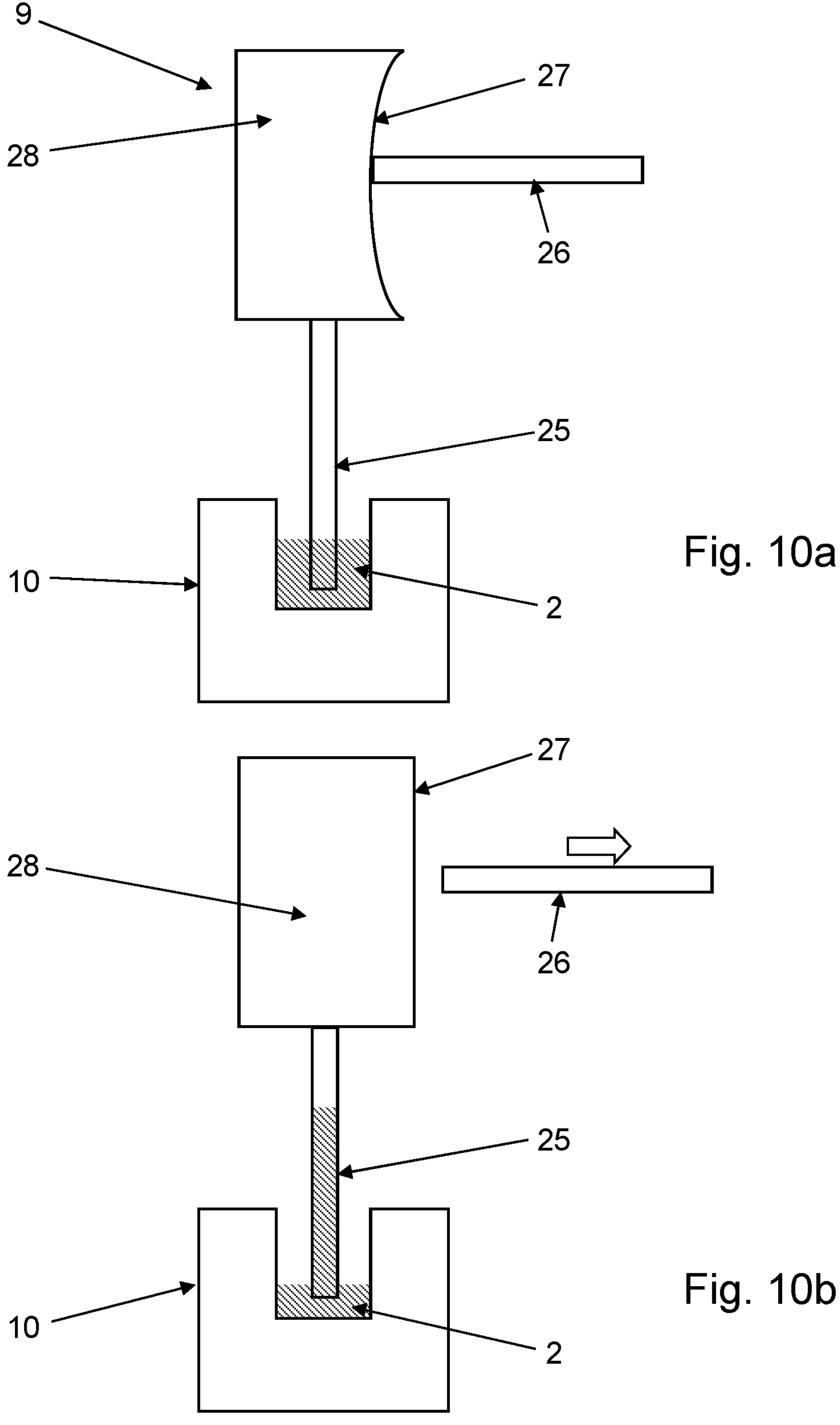
FIGS. 10*a* to 10*c* show a side view of a removal unit of the device according to some embodiments.
Figure 10C:
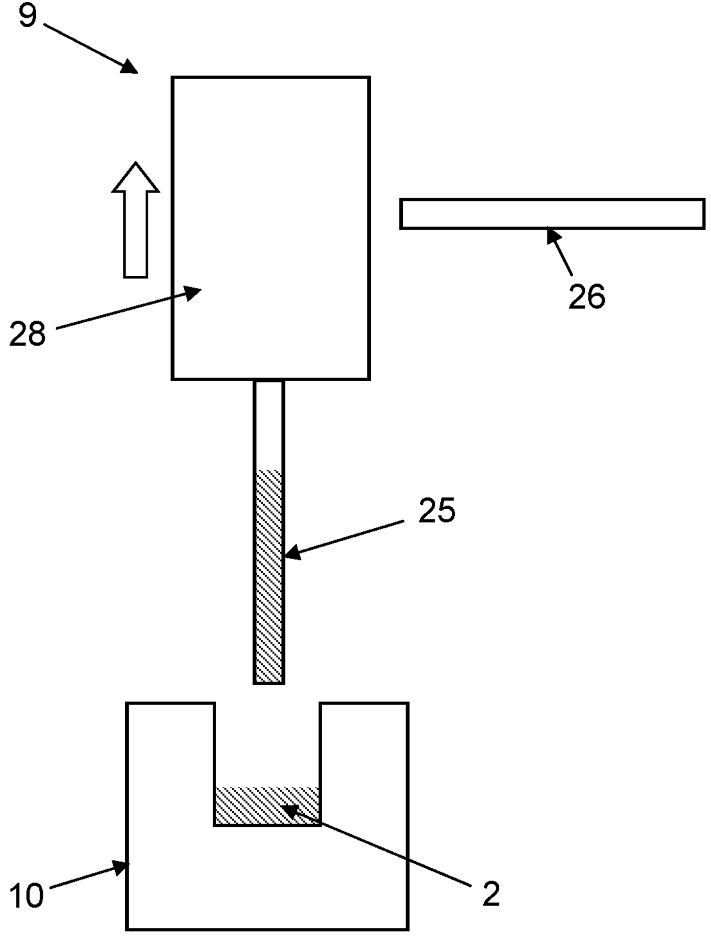
Figure 11:
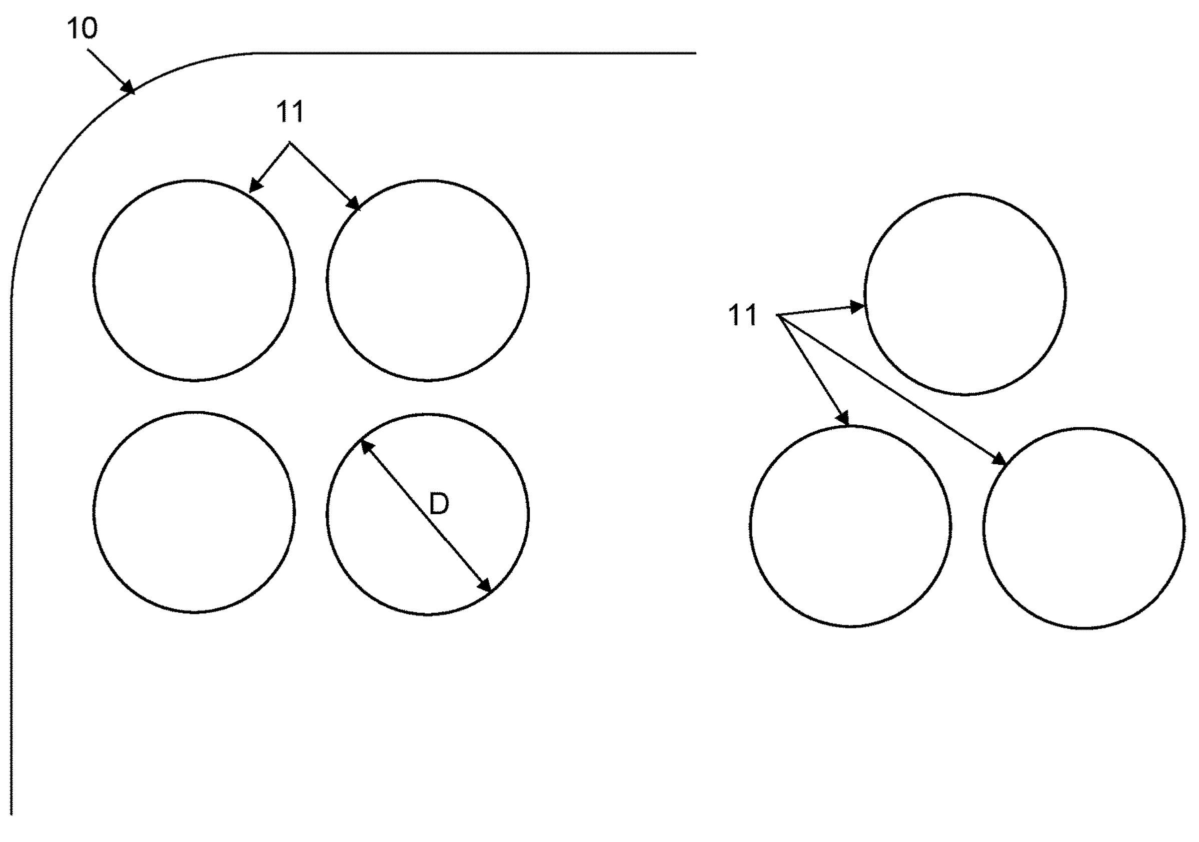
FIGS. 11 and 12 show a plan view of a sample holder of the device with different wells according to some embodiments.
Figure 11:
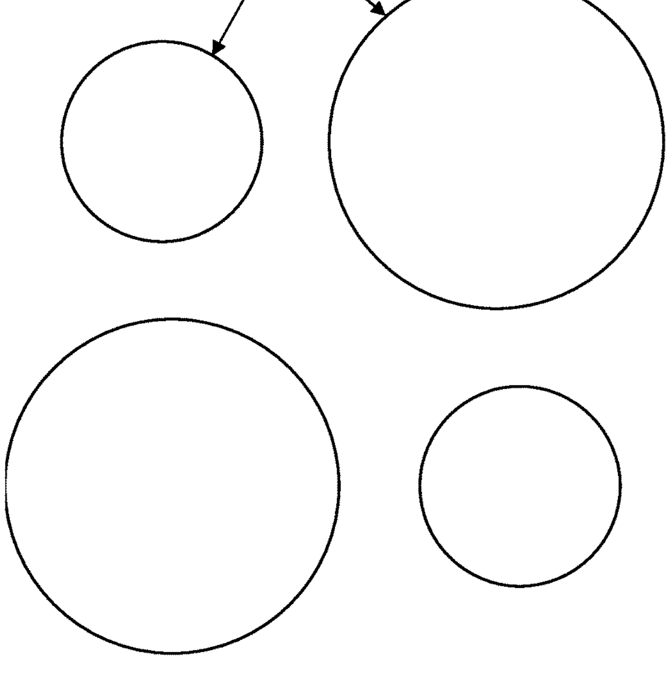
Figure 12:
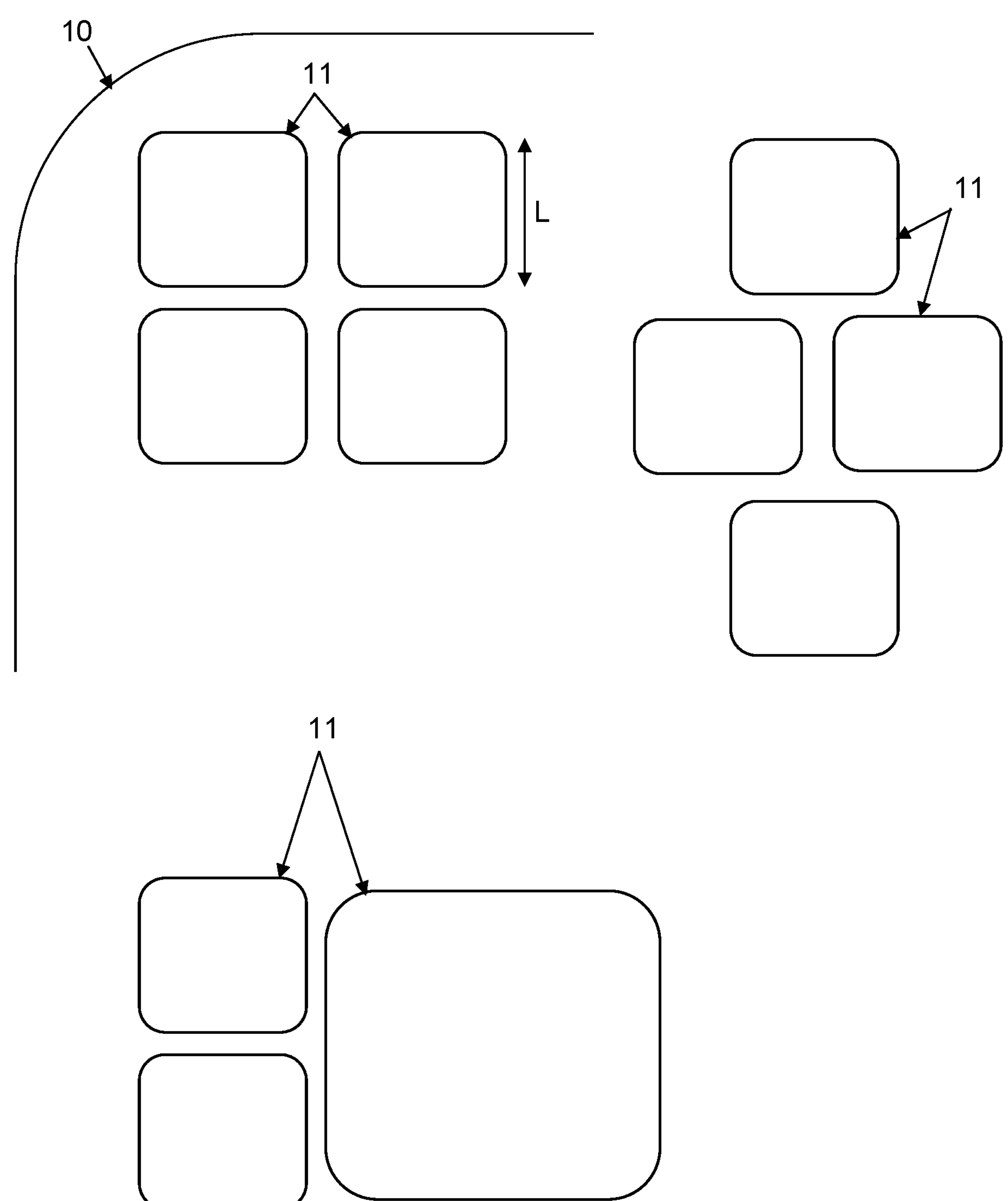
Figure 14A:
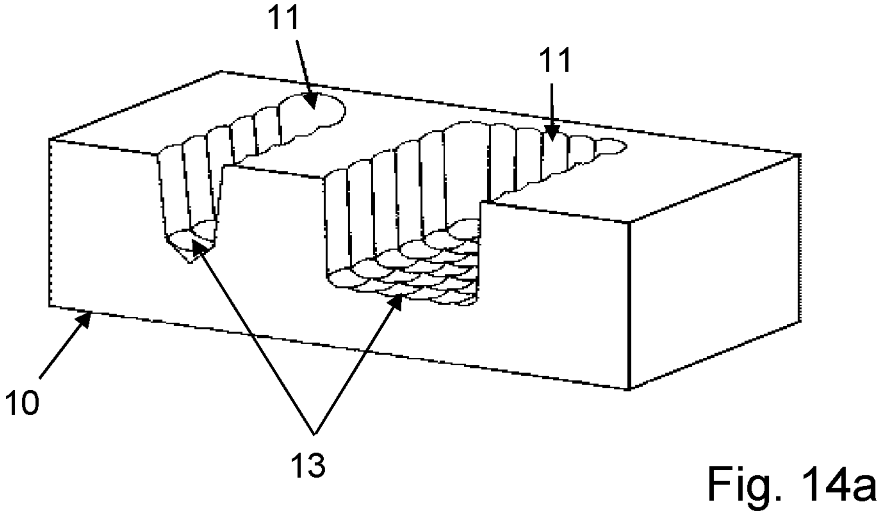
FIGS. 14*a* and 14*b* show a perspective illustration of different sample holders with a plurality of wells with different aspect ratios according to some embodiments.
Figure 14B:
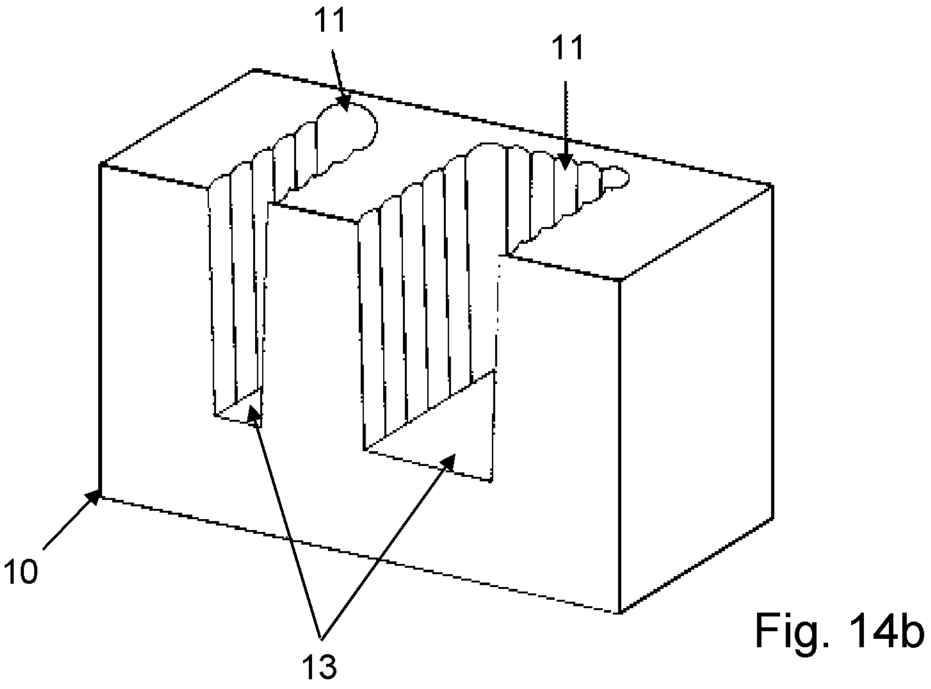
Figures 15A, 15B:
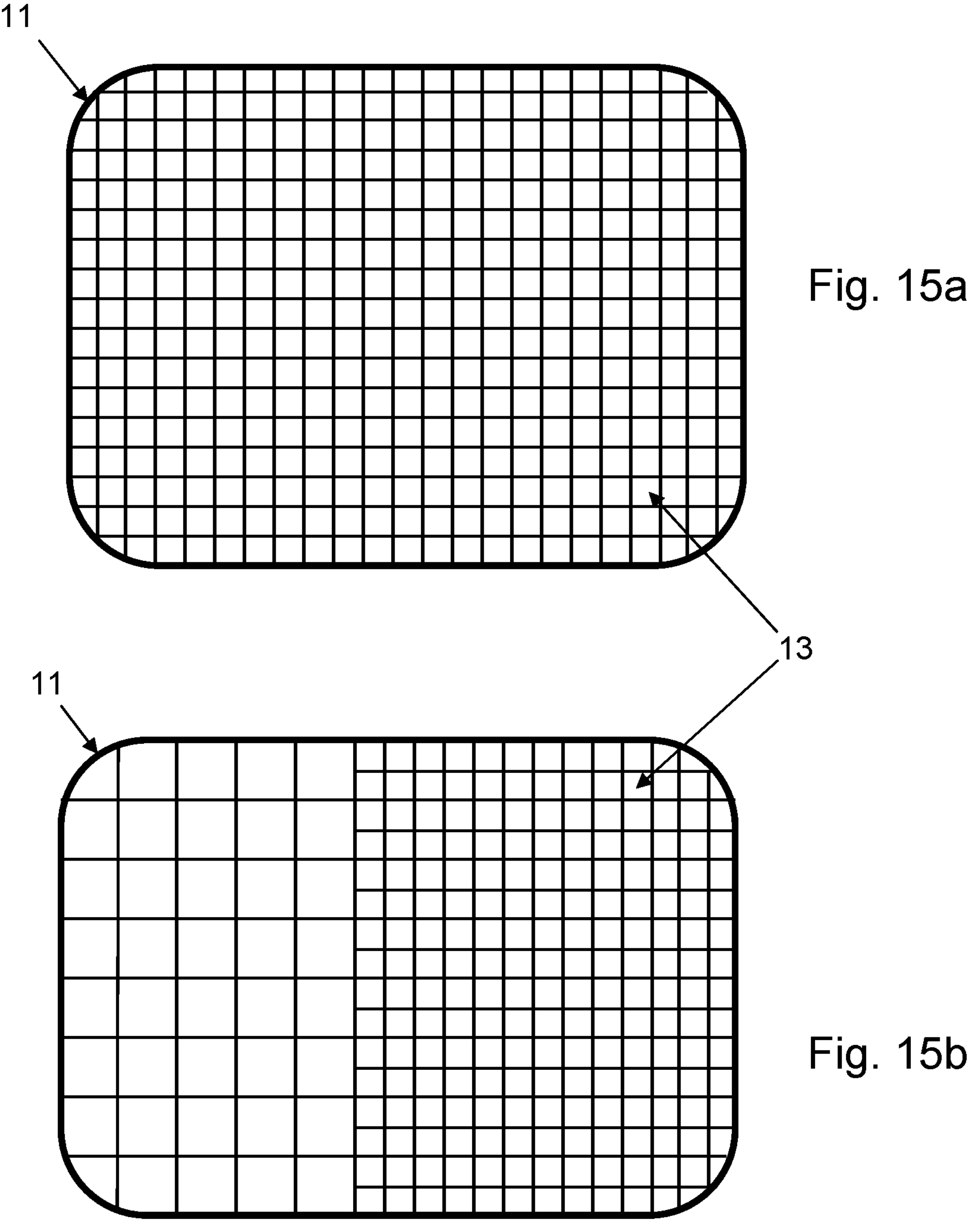
FIGS. 15*a* and 15*b* show a plan view of the wells of the sample holders shown in FIG. 14*a* according to some embodiments.
Figures 16A, 16B, 16C:
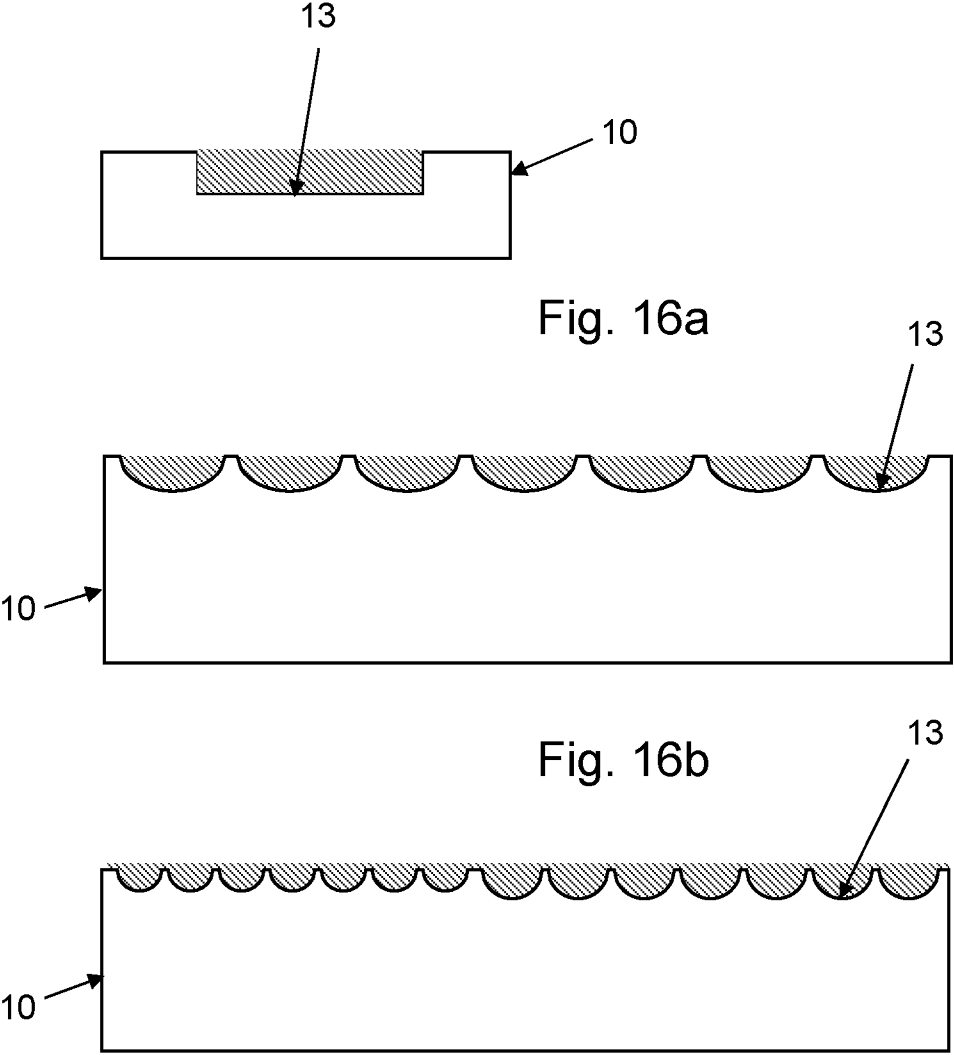
FIG. 16*a* shows a cross section through in each case one well of the sample holder shown in FIG. 14*b* according to some embodiments.
FIGS. 16*b* and 16*c* show a cross section through in each case one well of the sample holder shown in FIG. 14*a* according to some embodiments.
Figures 17A, 17B:
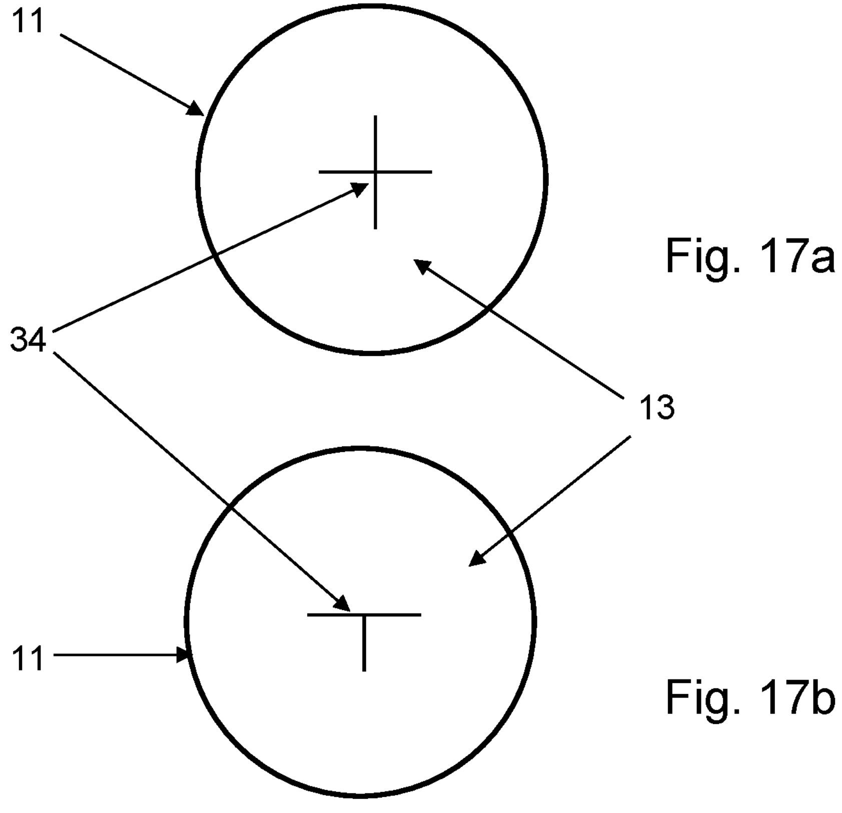
FIGS. 17*a* and 17*b* show a plan view of wells of the sample holder shown in FIG. 11, with markers on the base area according to some embodiments.

The functional principle of the dispensing unit 5 on the one hand and the removal unit 9 on the other hand is depicted in FIGS. 9*a* and 9*b* and, respectively, 10*a* to 10*c*. In this case, a capillary 25 made of plastic, glass or stainless steel serves to dispense or take up fluid, for example a cell suspension of the sample 2. In this case, a ram 26 acts on a flexible wall area 27 of a chamber 28, whereby the enclosed volume is modified, and a fluid drop of the sample 2 is ejected.

When applying the functional principle for the removal unit 9, the capillary 25 is immersed in a well 11 in the sample holder 10 filled with the sample 2 while the volume of the chamber 28 is reduced by the ram 26 against a restoring force. As soon as the pressure of the ram is reduced, the chamber 28 expands and aspirates some of the amount filled in the well.

FIGS. 11 to 18*b* show, by way of example, a plurality of constructions of various sample holders 10 which are designed as a well plate, in particular as a microwell plate made of glass, in which the wells 11 are introduced into the sample holder 10 by means of the LIDE method known per se. As is evident from the plan view in FIGS. 11 and 12, the wells 11 may have a circular or polygonal, for example rectangular, cross-sectional shape and have either corresponding or different cross-sectional areas and arrangements in the sample holder 10.

Figure 18A:
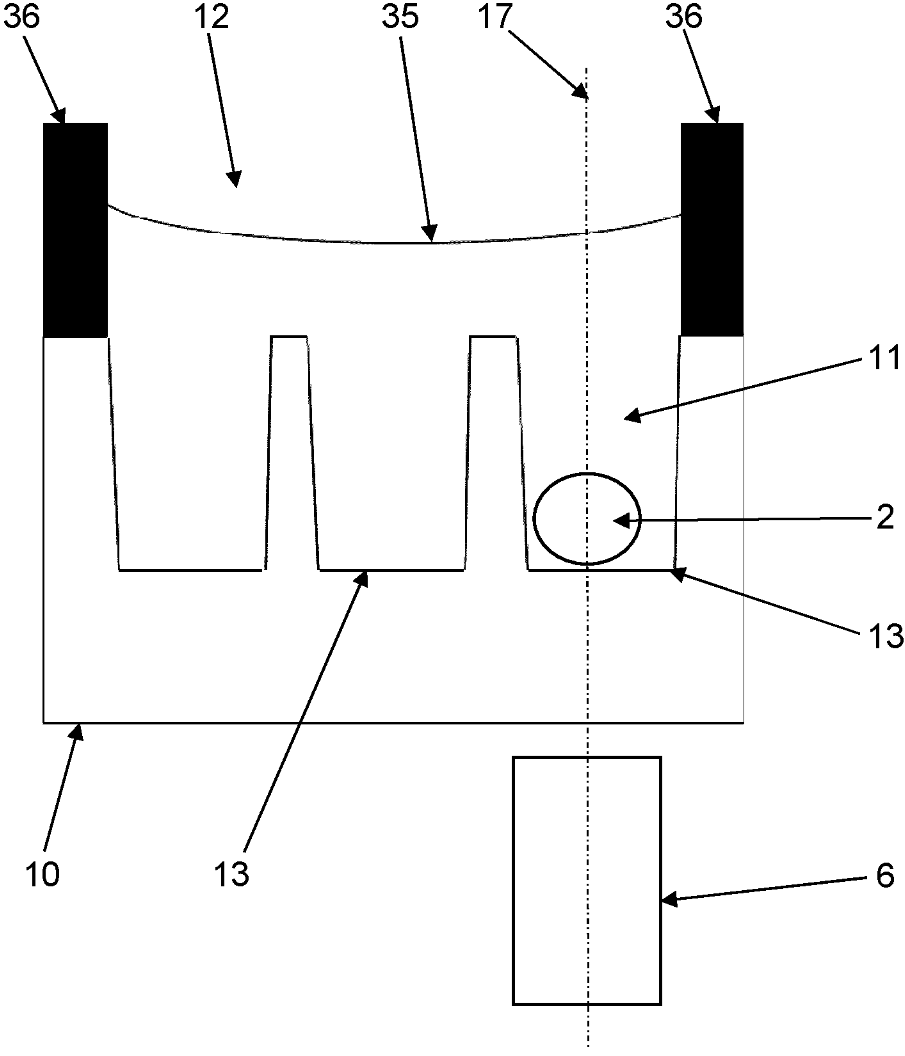
FIGS. 18*a* and 18*b* show a cross section through various sample holders containing a sample according to some embodiments.
Figure 18B:
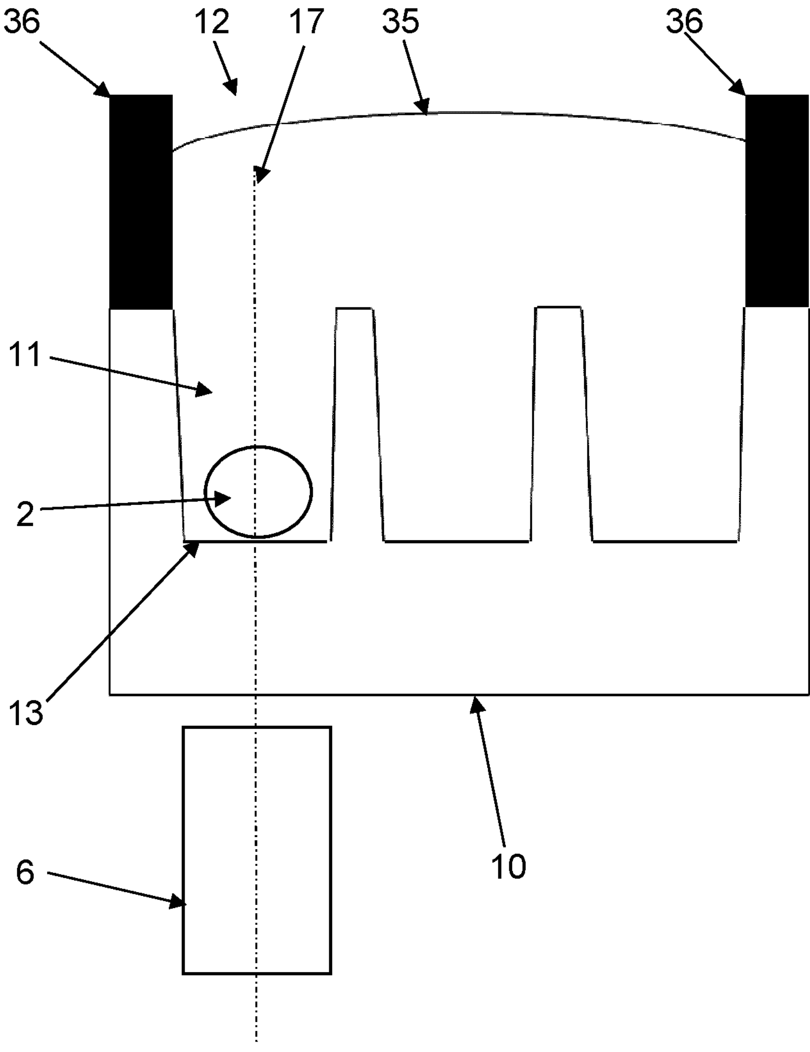

In this case, different structures of the base area 13 can be realized at the same time; this can be identified, likewise in exemplary fashion, in the cross-sectional illustrations of different wells 11 with for example cylindrical or conical basic shapes and different opening angles α, which are found in FIGS. 13*a* to 13*f*. By virtue of for example creating a topography or structuring with regular elevations in the base area 13, as evident from FIGS. 13*a*, 13*c*, 14*a*, 15*a*, 15*b*, 16*b* and 16*c*, the position of the samples 2 within the well 11 becomes predictable with statistical probability. In this case, it has already been found that once the sample 2 has adopted a position within the structuring, as depicted in FIGS. 18*a* and 18*b* for example, it does not leave this position even if the sample holder 10 is moved. This reduces the amount of time required to conduct the examination and manipulation.

These structures in the base area 13 can be identified by means of the optical examining unit 6, and so the referencing for positioning the sample holder 10 can be carried out on the basis of the structures captured by means of the optical examining unit 6 and/or the respective sample 2. In particular, on account of the captured position of the sample 2, it thus becomes possible for the first time to align the sample holder 10, as shown in FIGS. 18*a* and 18*b*, such that it is not only the well 11 that is located on the optical axis 17 but in particular the sample 2 itself as well. Additionally, markers 34 can be introduced into the base area 13, for example within the glass material or else into an external surface facing away from the well 11, for example in the case of a plane base area 13 corresponding to the wells 11 depicted in FIGS. 13*d*, 13*e*, 13*f*, 14*b*, and 16*a*, these markers being able to be optically captured and hence being alternatively or additionally usable as a positioning reference.

In this case, the wells 11 preferably have an aspect ratio of height H of the well vis-à-vis the diameter D or edge length L of the opening of greater than 1.

In order to further optimize the observation or else manipulation of the sample volume of the sample 2, the sample holder 10 may comprise a layer or a coating 36 in a region of the well assigned to the opening 12 in order to be able to purposefully set the nature of the forming meniscus 35 which, depending on the wetting of the fluid, arises as a convex or concave surface due to surface and interface tensions. Setting a plane fluid surface can also be realized, wherein the use of an inert fluid film, which is matched to the layer or a coating 36, for covering the sample 2 has already been found to be helpful.

Figure 19:
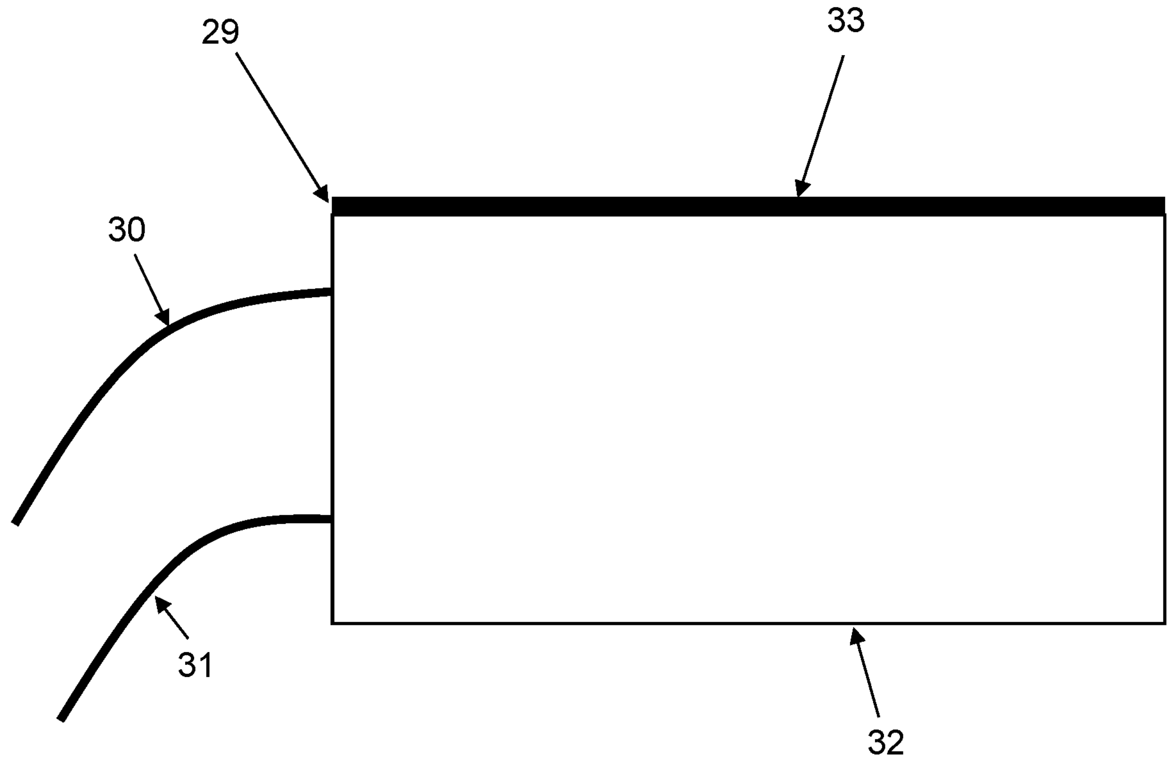
FIG. 19 shows a side view of a unit serving to receive the sample holder and introducible into the treatment space according to some embodiments.

Finally, in FIG. 19, there is a sealable unit 29 which is introducible into the treatment space of the device 1 and which delimits a sterile region enclosing the sample holder 10. The unit 29 has an inlet opening 30 and an outlet opening 31 for a gas and an at least sectionally transparent base 32 and a likewise at least sectionally transparent cover 33, with the result that the examination by means of the optical examining unit 6 can be conducted through the base and cover areas without needing to open the unit 29.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

| | |
|---|---|
| 1 | Device |
| 2 | Sample |
| 3 | Dispensing unit |
| 4 | Printing head |
| 5 | Dispensing unit |
| 6 | Examining unit |
| 7 | Objective |
| 8 | Capillary |
| 9 | Removal unit |
| 10 | Sample holder |
| 11 | Well |
| 12 | Opening |
| 13 | Base area |
| 14 | Receptacle |
| 15 | Arrow direction |
| 16 | Illumination unit |
| 17 | Axis |
| 18 | Arrow direction |
| 19 | Arrow direction |
| 20 | Calibration station |
| 21 | Cutout |
| 22 | Cross table element |
| 23 | Guide rail |
| 24 | Recess |
| 25 | Capillary |
| 26 | Ram |
| 27 | Wall area |
| 28 | Chamber |
| 29 | Unit |
| 30 | Inlet opening |
| 31 | Outlet opening |
| 32 | Base |
| 33 | Cover |
| 34 | Marker |
| 35 | Meniscus |
| 36 | Coating |
| α | Opening angle |
| D | Diameter |
| H | Height |
| L | Edge length |

The invention claimed is:

1. A device for examining and/or treating a sample, the device comprising, within a common treatment space:

at least one dispensing unit for dispensing the sample into at least one sample holder comprising a plurality of wells, each respective well having a respective opening and a base area, an optical examining unit comprising an image sensor, a microscope, and/or an objective, a removal unit for removing the sample from the at least one sample holder and for depositing or outputting a previously isolated sample and at least one receptacle for moving the at least one sample holder into different work positions within a work region in the treatment space delimited by a respective well of the sample holder, wherein in a respective work position, the optical examining unit the least one dispensing unit, and the removal unit are positioned within the work region coaxially on two opposite sides of the at least one sample holder along an optical axis of the optical examining unit, and wherein the base area of each respective well is transparent such that an optical capture of the sample is implemented through the base area;

wherein the dispensing unit or the optical examining unit is positionable at different vertical positions relative to the sample holder;

wherein the individual wells in the sample holder are at least sectionally designed in cylindrical or conical fashion with an opening angle greater than zero.

2. The device as claimed in claim 1, further comprising a control unit for referencing the respective work position based on the optical capture of the sample captured by the optical examining unit.

3. The device as claimed in claim 1, wherein at least a substantial proportion of the wells in the sample holder has an aspect ratio of a height of the well vis-à-vis, a diameter or an edge length of the opening of greater than 1.

4. The device as claimed in claim 1, wherein the receptacle comprises a cross table equipped with at least one cutout.

5. The device as claimed in claim 1, wherein the dispensing unit comprises at least one printing head.

6. The device as claimed in claim 1 wherein the sample holder is configured as a well plate made of glass.

7. The device as claimed in claim 1 wherein the wells in the sample holder are formed by laser-induced deep etching (LIDE) methods.

8. The device as claimed in claim 1 wherein a minimal dimension, a maximal dimension, a shape, and/or a structure of the sample are captured by the optical examining unit.

9. The device as claimed in claim 1, wherein the removal unit comprises a capillary with a first cross-sectional area facing the opening and a second cross-sectional area distant from the opening, the second cross-sectional area being larger than the first cross-sectional area.

10. The device as claimed in claim 9, wherein the capillary and/or the well comprises a hydrophobic coating at least in sections.

11. The device as claimed in claim 1, wherein the sample holder comprises markers or structures in a region of the base area.

12. The device as claimed in claim 1, wherein the receptacle and the sample holder are interlockingly connected only in a predetermined target position.

13. The device as claimed in claim 1, wherein the treatment space is sterile or sterilizable.

14. The device as claimed in claim 13, further comprising a sealable unit configured to delimit a sterile region enclosing the sample holder.

15. A method for examining and/or treating a sample the method comprising:

dispensing the sample into at least one well of a sample holder by using a dispensing unit, the at least one well being delimited by a transparent base area, and optically capture the sample through the base area by using an optical examining unit removing the sample from the well by using a removal and moving the sample holder into different work positions by using a receptacle, wherein in a respective work position, the optical examining unit, the dispensing unit and the removal unit are positioned within a work region coaxially on two opposite sides of the sample holder along an optical axis of the optical examining unit;

wherein the dispensing unit or the optical examining unit is positionable at different vertical positions relative to the sample holder;

wherein the individual wells in the sample holder are at least sectionally designed in cylindrical or conical fashion with an opening angle greater than zero.

16. The method as claimed in claim 15, wherein the sample dispensed into the well is contained in a carrier fluid, and the method further comprising subsequently applying a further fluid to the carrier fluid as a cover or a fluid film.

17. The method as claimed in claim 15, further comprising, during the capturing of the sample by the optical examining unit, successively directing a field of view to different cross-sectional planes within the well.

* * * * *